(12) United States Patent
Hori et al.

(10) Patent No.: US 11,635,299 B2
(45) Date of Patent: Apr. 25, 2023

(54) METHOD AND SYSTEM FOR SCENE-AWARE INTERACTION

(71) Applicant: Mitsubishi Electric Research Laboratories, Inc., Cambridge, MA (US)

(72) Inventors: Chiori Hori, Lexington, MA (US); Anoop Cherian, Boston, MA (US); Siheng Chen, Boston, MA (US); Tim Marks, Boston, MA (US); Jonathan Le Roux, Cambridge, MA (US); Takaaki Hori, Lexington, MA (US); Bret Harsham, Boston, MA (US); Anthony Vetro, Arlington, MD (US); Alan Sullivan, Boston, MA (US)

(73) Assignee: Mitsubishi Electric Research Laboratories, Inc.

( * ) Notice: Subject to any disclaimer, the term of this patent is extended or adjusted under 35 U.S.C. 154(b) by 0 days.

(21) Appl. No.: 16/784,103

(22) Filed: Feb. 6, 2020

(65) Prior Publication Data

US 2021/0247201 A1 Aug. 12, 2021

(51) Int. Cl.
*G01C 21/36* (2006.01)
*G01S 19/48* (2010.01)

(52) U.S. Cl.
CPC ....... *G01C 21/3629* (2013.01); *G01C 21/367* (2013.01); *G01C 21/3664* (2013.01); *G01C 21/3673* (2013.01); *G01C 21/3691* (2013.01); *G01S 19/485* (2020.05)

(58) Field of Classification Search
CPC ............ G01C 21/3629; G01C 21/3664; G01C 21/367; G01C 21/3673; G01C 21/3691; G01S 19/485
See application file for complete search history.

(56) References Cited

U.S. PATENT DOCUMENTS

| 7,831,433 B1* | 11/2010 | Belvin | G10L 15/18 704/275 |
| 11,257,493 B2* | 2/2022 | Vasconcelos | G06V 10/768 |
| 11,260,872 B2* | 3/2022 | Chen | G06V 20/597 |
| 2008/0319659 A1* | 12/2008 | Horvitz | G01C 21/3644 701/33.4 |
| 2011/0130956 A1* | 6/2011 | Tracton | G01C 21/3644 701/533 |

(Continued)

*Primary Examiner* — Rachid Bendidi
*Assistant Examiner* — Sahar Motazedi
(74) *Attorney, Agent, or Firm* — Gennadiy Vinokur; Hironori Tsukamoto

(57) ABSTRACT

A navigation system for providing driving instructions to a driver of a vehicle traveling on a route is provided. The driving instructions are generated by executing a multimodal fusion method that comprises extracting features from sensor measurements, annotating the features with directions for the vehicle to follow the route with respect to objects sensed by the sensors, and encoding the annotated features with a multimodal attention neural network to produce encodings. The encodings are transformed into a common latent space, and the transformed encodings are fused using an attention mechanism producing an encoded representation of the scene. The method further comprises decoding the encoded representation with a sentence generation neural network to generate a driving instruction and submitting the driving instruction to an output device.

14 Claims, 20 Drawing Sheets

(56) References Cited

U.S. PATENT DOCUMENTS

| | | | |
|---|---|---|---|
| 2015/0061895 A1* | 3/2015 | Ricci | B60R 25/00 |
| | | | 340/902 |
| 2015/0160033 A1 | 6/2015 | Censo et al. | |
| 2017/0314954 A1* | 11/2017 | Golding | G01C 21/3602 |
| 2018/0189572 A1* | 7/2018 | Hori | G06V 10/462 |
| 2019/0056237 A1* | 2/2019 | White | G08G 1/096833 |
| 2019/0325746 A1* | 10/2019 | Lewis | G06F 3/013 |
| 2019/0371052 A1* | 12/2019 | Kehl | G06V 20/584 |
| 2020/0219497 A1* | 7/2020 | Castelli | G10L 15/22 |
| 2021/0166340 A1* | 6/2021 | Nikola | G06T 3/00 |

* cited by examiner

METHOD AND SYSTEM FOR SCENE-AWARE INTERACTION

FIELD OF THE INVENTION

This invention generally relates to a method and system for providing a scene-aware interaction system, and more specifically to a scene-aware interaction navigation system for providing a route guidance to a driver of a vehicle based on real-time unimodal or multimodal information about static and dynamic objects in the vicinity of vehicle.

BACKGROUND OF THE INVENTION

Navigation assistance to a driver for driving a vehicle is commonly provided by a system, such as a GPS receiver, that can provide spoken route guidance to the driver. The route guidance is in the form of turning instructions that most commonly indicate the distance to the turning point, the direction of the turning and possible some extra information to make clear where to turn such as "in 100 feet take the second right onto Johnson street." However, this approach to providing route guidance to a driver can be confusing to the driver in certain situations, for example when the driver does not know and cannot easily recognize that the name of the street in which to turn is "Johnson street", or when there are multiple streets and pathways in close proximity. The driver may then fail to identify the correct street in which to turn and miss the turn, get confused, potentially leading to a dangerous situation.

Alternately, there are route guidance systems that can use stored information related to points of interest from a map to indicate a turning point, such as "turn in 100 feet at the post office". However, this approach can be confusing to the driver in certain situations, such as when trees or a vehicle are hiding the post office or making it difficult to identify, or when the stored information is outdated and there is no longer a post office at that turning point.

Alternately, there are experimental route guidance systems that can accept real-time camera images captured by the driver and overlay on the real-time images graphical elements, such as an arrow, that indicate a specific route to follow. However, this approach does not provide a descriptive sentence that is spoken aloud, and requires the driver to take their eyes off the road to see the route guidance.

SUMMARY OF THE INVENTION

Scene-aware interaction systems can be applied to several applications, such as in-vehicle infotainment and home appliances, interaction with service robots in building systems, and surveying systems. GPS is merely one localization method for a navigation system; other localization methods can be used for other applications. In the following, the navigation system is described as one of example applications of a scene-aware interaction.

At least one realization of the present disclosure was that existing approaches are different from a guidance that a hypothetical passenger who would know where to turn would provide to the driver. Passengers who are knowledgeable of a route and provide guidance to a driver who is not, typically consider both static and dynamic objects to formulate a driving instruction that they deem the most intuitive, natural, relevant, easily understandable, clear, etc., in order to help the driver safely follow an intended route.

At least one other realization of the present disclosure was that existing approaches do not make use of real-time information about dynamic objects in the vicinity of the vehicle, such as other vehicles, to identify reference points to provide route guidance. At least one other realization of the present disclosure was that existing approaches do not make use of real-time information to take into account current circumstances that may alter or impact the proper way to describe a static object in the vicinity of the vehicle such that it can be easily identified by a driver, such as other objects such as vehicles or tress obstructing the view, the appearance of the static object being different from a stored appearance of the static object in a static database, for example due to construction or renovation, or simply the static object no longer existing thus making it irrelevant as a reference point to provide route guidance.

It is an object of some embodiments to provide route guidance to a driver of a vehicle based on real-time unimodal or multimodal information about static and dynamic objects in the vicinity of the vehicle. For example, it is an object of some embodiments to provide context-based driving instructions like "turn right before the brown brick building" or "follow the white car" in addition to or in alternative to GPS based instructions like "in 100 feet take the second right onto Johnson street." Such context-based driving instructions can be generated based on real-time awareness of a scene in proximity of the vehicle. To that end, the context-based navigation is referred herein as a scene-aware navigation.

Some embodiments are based on understanding that at different point of time different number or types of the objects can be pertinent to the route for driving the vehicle. All of these pertinent objects can be potentially useful for scene-aware navigation. However, in contrast with autonomous driving where driving decisions are made by a computer, human drivers can be confused and/or distracted when the driving instructions are made with respect to too many different objects or to objects that a human driver may not easily identify. Accordingly, because different objects can be more or less relevant to contextual driving instructions, it is an object of some embodiments to select an object from a set of salient objects pertinent to the route of the driver and to generate the driving instruction based on description of that salient object.

The route guidance system of the present invention may receive information from multiple sources, including a static map, the planned route, the vehicle's present position as determined by GPS or other methods, and real-time sensor information from a range of sensors including, but not limited to, one or more cameras, one or more microphones, and one or more range detectors including radars and LIDAR. The real-time sensor information is processed by a processor that is able to detect, from the real-time sensor information, a set of salient static and dynamic objects in the vicinity of the vehicle as well as a set of object attributes that may include, for example: each object's class, such as car, truck, building; and the object's color, size, and location. For dynamic objects, the processor may also determine the dynamic object's trajectory. In the case of sound information acquired by microphones, the processor may detect the object's class by identifying the type of sound, and the object attributes may include the object's direction and distance from the vehicle, the object's motion trajectory, and the intensity of the sound. The set of salient objects as well as their set of attributes is hereafter referred as the dynamic map.

The route guidance system processes the dynamic map using a number of methods such as rule-based methods, or machine learning-based methods, in order to identify a salient object from the set of salient objects based on the route, to use as a selected salient object in order to provide route guidance.

The conveying of route guidance information may include highlighting the salient objects using a bounding rectangle, or other graphical elements, on a display such as, for example, an LCD display in the instrument cluster or central console. Alternately, the method of conveying may consist of generating a sentence, using, for example, a rule-based method or a machine learning-based method, which includes a set of descriptive attributes of the salient object. The generated sentence may be conveyed to the driver on the display. Alternately, the generated sentence may be converted by speech synthesis into spoken sounds that can be heard by the driver.

It is a further object of this invention that the salient objects may be determined by taking into account the distance of the vehicle from a route turning point. In particular, a number of different salient objects may be selected at various ranges of distances so that at each distance range the selected salient object provides the maximum information to the driver about the planned route. For example, at a large distance from the turning point a large static object such as a building close to the turning point may be determined as the salient object because the turning point cannot yet be seen clearly, while at a short distance from the turning point a dynamic object such as another vehicle already proceeding along the planned route may be determined as the salient object because it can be seen clearly and is sufficiently distinctive to be used for route guidance.

It is a further object of this invention that depending on the planned route the route guidance system of the present invention may provide descriptive warning in some form about other objects in the vicinity of the vehicle. For example, if the next step of the planned route is to turn, and the route guidance system detects the presence of an obstacle on the planned route, then a descriptive warning message may be conveyed to the driver to alert them to the presence of the object. More specifically, if a person is crossing, or appears to be ready to cross, the street at a point near the vehicle along the planned route the route guidance system may provide a descriptive warning message. For example, the route guidance system may generate and say out loud a sentence that reads, "Warning, a person is in the crosswalk on your left."

It is a further object of this invention to provide for the possibility of a two-way interaction between the driver and the route guidance system of the present invention that enables the driver to seek clarification about the location, attributes, or other information concerning the salient object as well as to request a different salient object. The two-way interaction may consist of one or more interaction mechanisms including spoken dialog in which an automatic speech recognizer enables the route guidance system to acquire the text of an utterance by the driver so that the system can process it to understand and adapt to the driver's response to the system. The interaction may also include information captured by one or more cameras that receive images of the driver and are input into a computer vision subsystem that can extract information about the driver including, but not limited to, the driver's gestures such as the pointing of the driver's hand, or the driver's gaze direction. The interaction may also include manual input from the driver including the pressing of one or more control buttons that may be arranged in a fashion that is accessible to the driver, such as, for example on the steering wheel, instrument cluster or central console.

According to some embodiments, a navigation system is configured to provide driving instructions to a driver of a vehicle based on real-time description of objects in a scene pertinent to driving the vehicle. The navigation system may include an input interface configured to accept a route for driving the vehicle, a state of the vehicle on the route at a current instance of time, and a dynamic map of a set of salient objects pertinent to the route of the vehicle at the current instance of time, wherein at least one salient object is an object perceived by a measurement system of the vehicle moving on the route between a current location at the current instance of time and a future location at a future instance of time, wherein the set of salient objects includes one or multiple static objects and one or multiple dynamic objects; a processor configured to generate a driving instruction based on a description of a salient object in the dynamic map derived from a driver perspective specified by the state of the vehicle; and an output interface configured to render the driving instruction to the driver of the vehicle.

Some embodiments of a present disclosure are based on the recognition that scene aware interaction with a user (operator) can be performed based on attentional multimodal fusion, which analyzes multimodal sensing information and provides a more natural and intuitive interaction with humans through context-dependent natural language generation.

In some cases, the multimodal sensing information may be images/videos captured by cameras, audio information acquired by microphones, and localization information estimated by range sensors such as LiDAR or radar.

The attentional multimodal fusion with scene understanding technology and context-based natural language generation realizes a powerful scene-aware interaction system to more intuitively interact with users based on objects and events in the scene. Scene-aware interaction technology has wide applicability to a number of applications including a human-machine interface (HMI) for in-vehicle infotainment and home appliances, interaction with service robots in building systems, and surveying systems.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
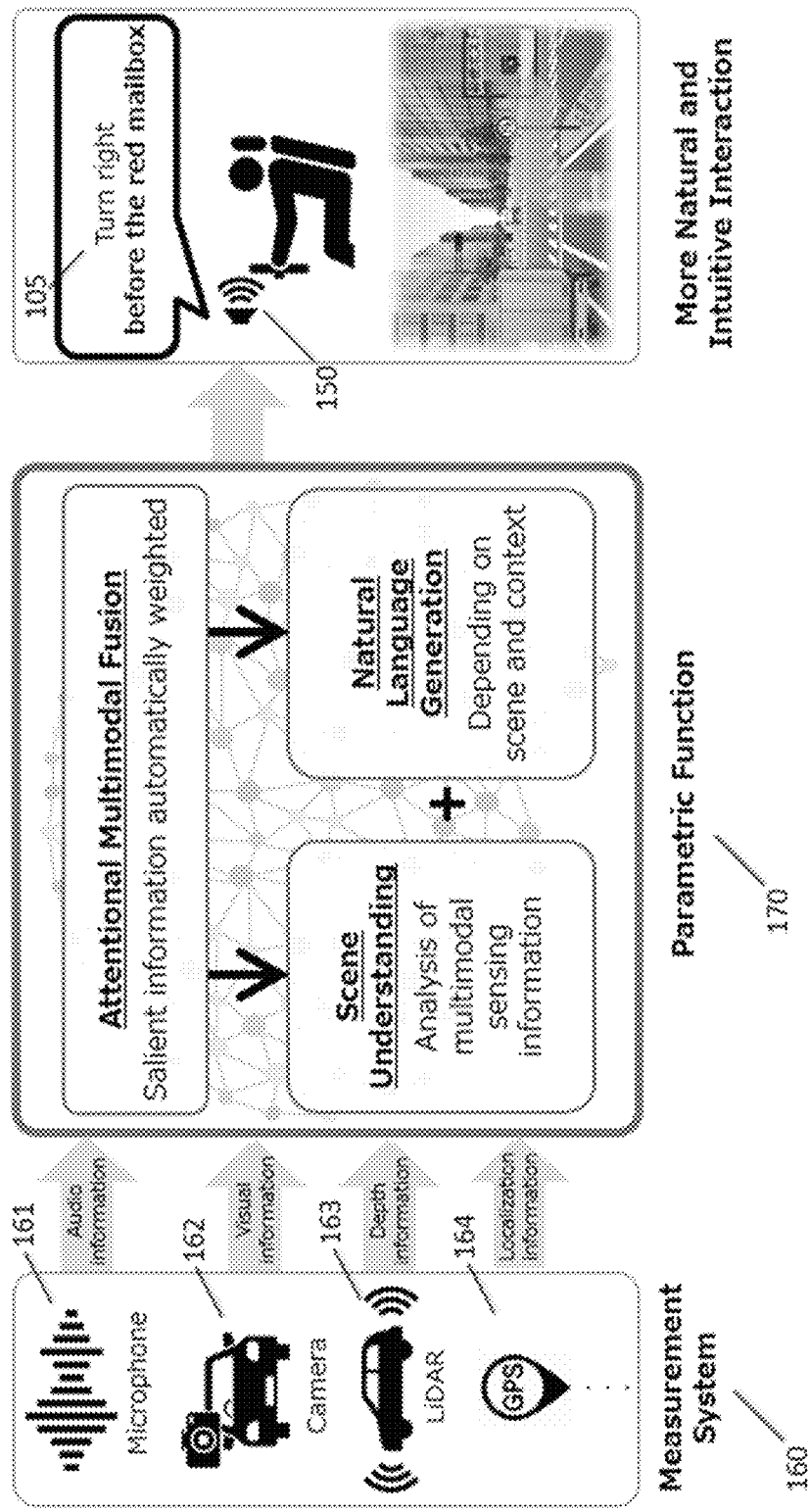
FIGS. 1A-1D show a block diagram and illustrations of a navigation system according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

FIGS. 1A-1D show a block diagram and illustrations of a navigation system according to some embodiments of the present disclosure. In some cases, a navigation system may be referred to as a route guidance system, and a route guidance system may be referred to as a navigation system.

FIG. 1A is a block diagram of a navigation system illustrating features of some embodiments. A set of salient objects in a dynamic map may be identified and described based on sensing information perceived by a measurement system 160 of the vehicle, which includes information from one or multiple modalities such as audio information from a microphone 161, visual information from a camera 162, depth information from a range sensor (i.e., depth sensor) such as LiDAR 163, and localization information from a global positioning system (GPS) 164. The system outputs a driving instruction 105 based on a description of one or multiple salient objects from the set of salient objects. In some embodiments, the processor generates the driving instruction 105 by submitting the measurements from the measurement system 160 to a parametric function 170 that has been trained to generate the driving instruction from the measurements. In other embodiments, the multimodal sensing information obtained by the measurement system is used in the determination of a state of the vehicle (which we also refer to in this document as the vehicle state) and the dynamic map. The processor is configured to submit the state of the vehicle and the dynamic map to a parametric function 170 that is configured to generate the driving instruction 105 based on a description of a salient object in the dynamic map derived from a driver perspective specified by the state of the vehicle.

Figure 1B:
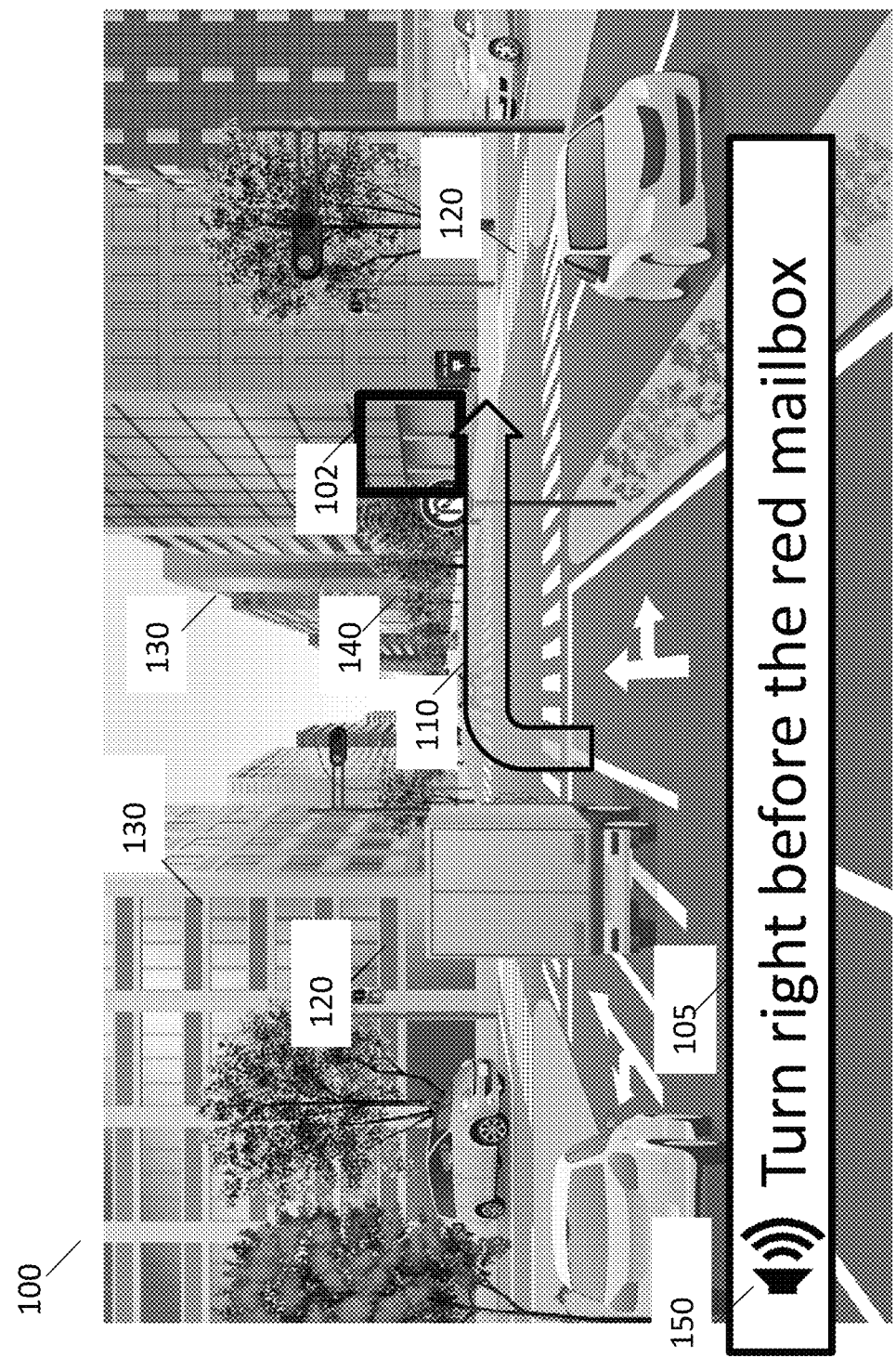
Figure 1C:
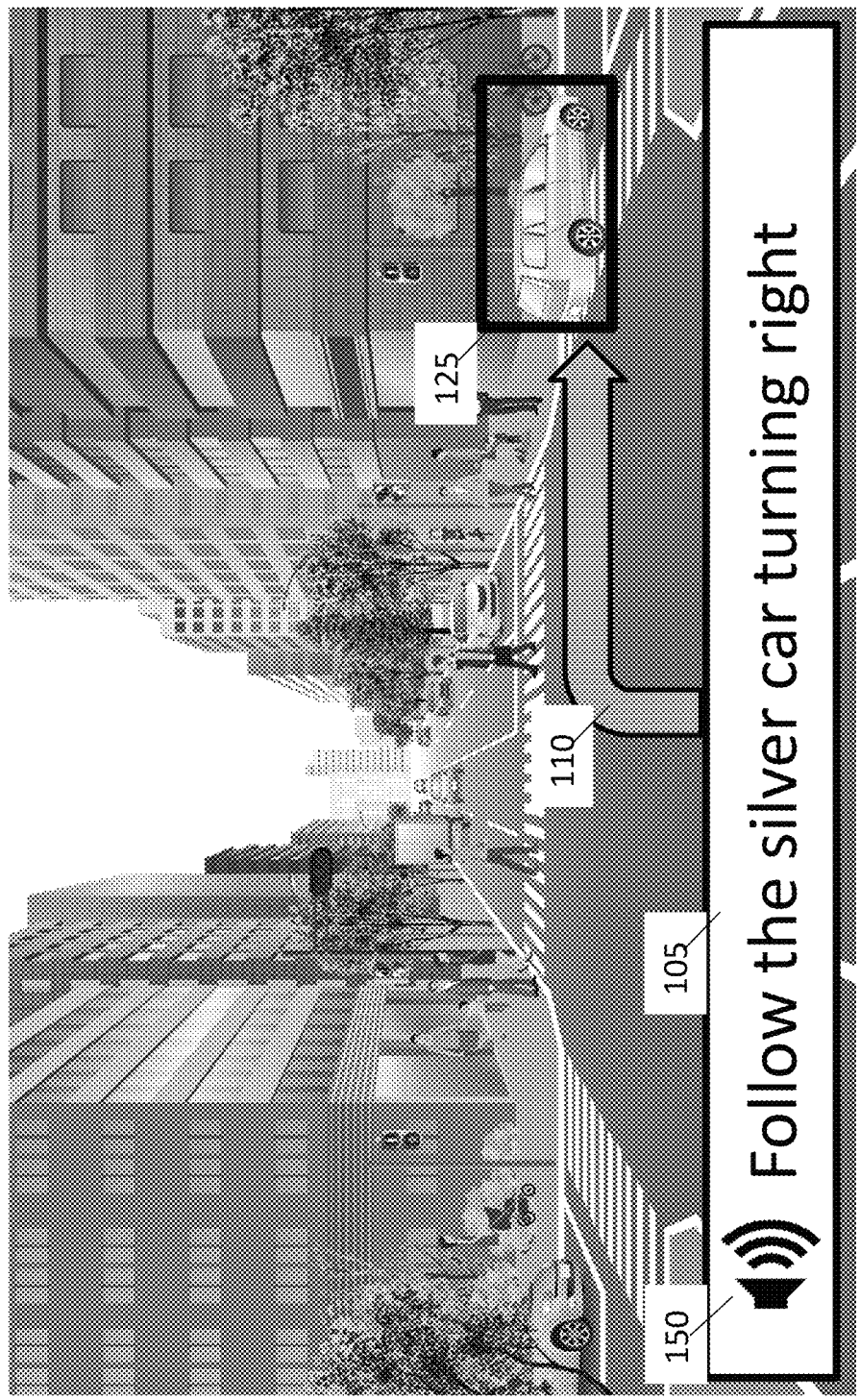
Figure 1D:
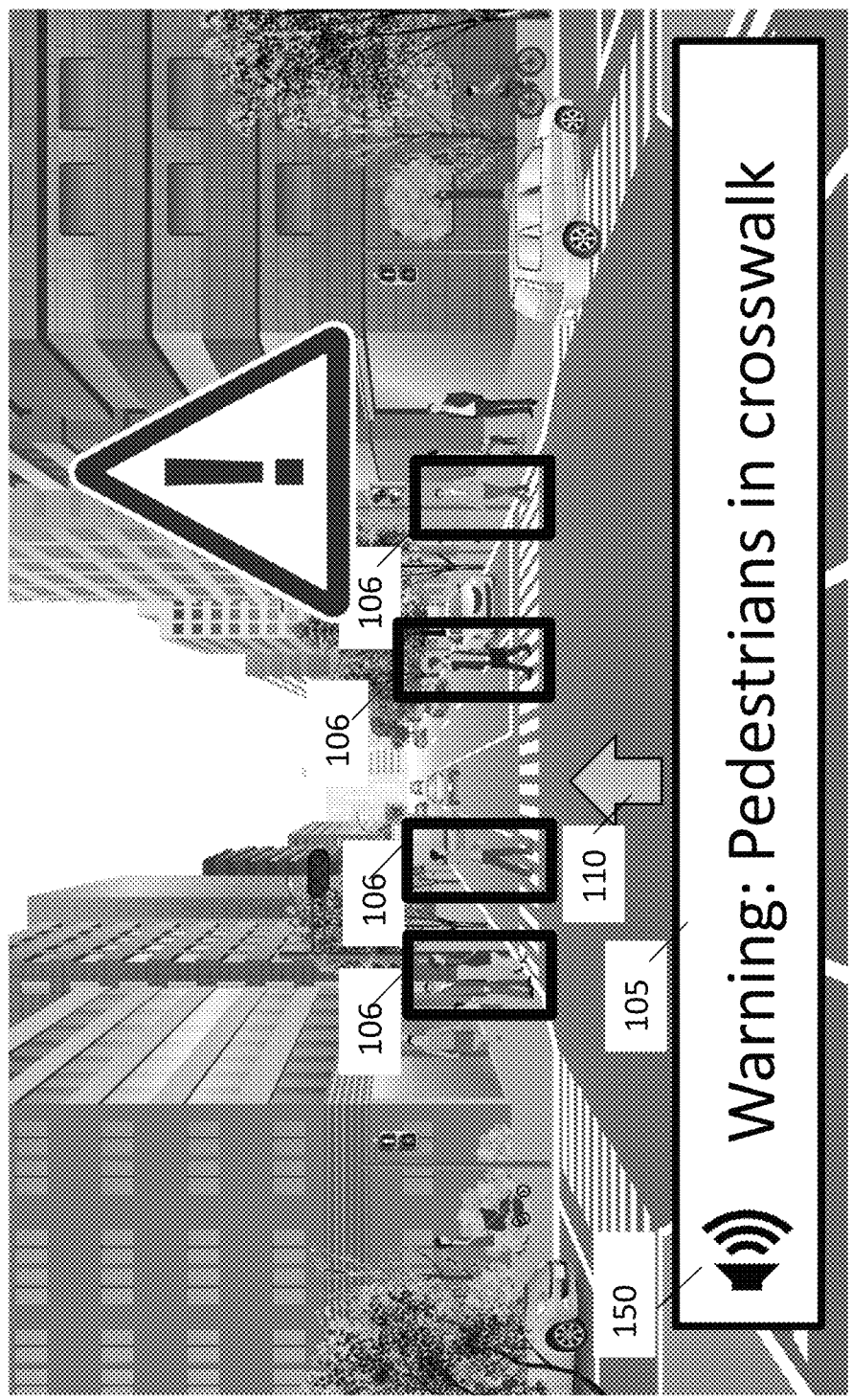

FIGS. 1B, 1C, and 1D show illustrations of the navigation system, according to some embodiments of the present invention. The system has obtained a route for driving the vehicle, and has information about the state of the vehicle on the driving route 110 at a current instance of time. It is understood that the route consists of a sequence of segments and turns, wherein each segment has a definite length and location, and each turn is in a particular direction that leads from one segment or turn to another. In some embodiments, the segments and turns are portions of road that connect to provide a path that the vehicle may follow to travel from one location to another location. The route is represented by a portion of the driving route 110 that will soon be traversed by the vehicle, illustrated as an arrow overlaid on the road. In some embodiments, the state of the vehicle includes the vehicle's location and orientation with respect to a dynamic map, which contains a set of salient objects pertinent to driving the vehicle on the route. The salient objects include one or multiple static objects (i.e., objects that are always stationary) such as a building 130, a sign 140, or a mailbox 102, and one or multiple dynamic objects (i.e., objects that have the capability to move) such as other vehicles 120, 125 or pedestrians 106. In some embodiments, dynamic objects that are not currently moving but have the capability to move, such as cars that are parked or pedestrians that are currently standing still, are considered to be dynamic objects (albeit with velocity equal to zero). The system includes a processor configured to generate a driving instruction 105, which is rendered to the driver of the vehicle via an output interface such as a voice synthesis system 150.

In some embodiments, the driving instruction includes a salient object (102, 125, 126) in the dynamic map derived from a driver perspective specified by the state of the vehicle. For example, in FIG. 1B, the driving instruction 105 is based on a description "the red mailbox" of a salient object 102, which was selected from the set of salient objects in the dynamic map based on the driver perspective. In some embodiments, the driver perspective includes the current location of the vehicle with respect to the dynamic map and the portion of the route 110 that is relevant based on the current location and orientation of the vehicle. For example, "the red mailbox" was selected in part because it is located in the direction of the upcoming turn in the route 110. In an alternative situation (not shown in FIG. 1B) in which the upcoming turn 110 is a left turn, the driving instruction would be based on a different object 130 whose description "the blue building" is used in a driving instruction such as "Turn left before the blue building," because the blue building 130 is more relevant than the red mailbox 102 from the perspective of a driver who is about to turn left.

In FIG. 1C, the driving instruction 105 is based on a description "the silver car turning right" of a salient object 125 in the dynamic map. In FIG. 1D, the driving instruction 105 is a warning based on a description "pedestrians in crosswalk" of a set of salient objects in the dynamic map: the pedestrians 106 and the crosswalk. These objects are important from the driver perspective because they are visible to the driver of the vehicle and they are on the next portion of the route 110 of the vehicle.

Figure 2:
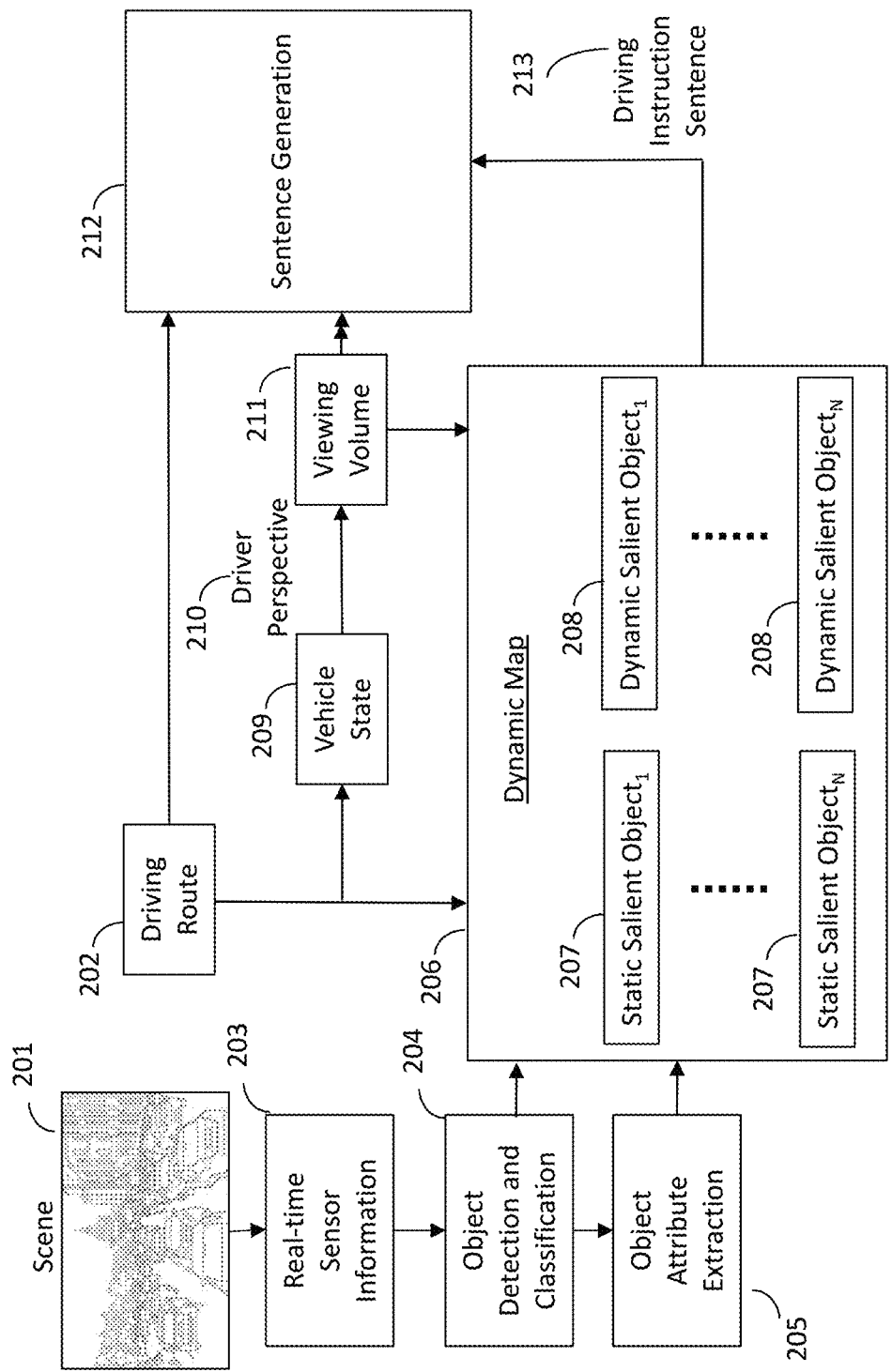
FIG. 2 is a schematic diagram of the route guidance system illustrating the flow of information from the external scene of the vehicle vicinity to the output driving instruction, according to some embodiments of the present disclosure.

FIG. 2 is a schematic diagram of the proposed route guidance system illustrating the flow of information from the external scene 201 of the vehicle vicinity to the output driving instruction 213. The vehicle is equipped with a number of real-time sensor modalities which supply real-time sensor information 203 to the route guidance system. An object detection and classification module 204 processes the real-time sensor information 203 using a parameterized function in order to extract information about objects in the vicinity of the vehicle including both their locations relative to the vehicle as well as their class type, wherein the class types include at least building, car, truck, and pedestrian. An object attribute extraction module 205 performs additional operations to extract a set of object attributes for each detected object, wherein the set of attributes includes at least color, distance from the vehicle and size, and for some particular classes of objects may also include trajectory information such as velocity and direction of motion. It is understood by one of ordinary skill in the art that there may be a different set of attributes for each different class of object. For example, a truck might have the attribute of truck type that, for example, may take a value of one of box, semi, dump, etc. as needed to enable the sentence generator 212 to generate a highly descriptive driving instruction sentence 213 for route guidance. A dynamic map 206 receives the information from the object detection and classification module 204 and the object attribute extraction module 205 as well as the planned driving route 202 and the viewing volume 211 as determined by the vehicle state 209. The dynamic map 206 uses the driving route information 202 to identify a subset of the detected objects which are salient to the planned route. Salient objects refer to an object that is pertinent to the driving route by being, for example, on the same corner as a route turning point, or on the planned route just past a turning point. The dynamic map consists of a set of salient static and dynamic objects, including their class types and attributes, which are candidate objects to be used to provide route guidance to the driver.

The vehicle state 209 includes one or a combination of the vehicle location, speed and orientation. In some embodiments, the driver perspective 210 is the viewing position of the driver given the driver's seat height and the range of angles over which the driver can reasonably see without excessive head motion, for example +/−60 degrees around the front direction of the car. The driver perspective 210 is used to determine a viewing volume 211, which is the subset of space that the driver can see. This is useful because one or more real-time sensors may be mounted on the car in such a way as to enable them to see objects that cannot be seen by the driver. For example, a roof-mounted LIDAR may be able to detect a first object that is beyond another closer second object, but the first object is occluded by the second object as seen from the driver's perspective 210. This makes the first object not a suitable salient object at that moment since it cannot be seen. Therefore, the dynamic map 206 may also use the viewing volume 211 to determine the set of salient objects. Alternately, a salient object that cannot be seen from the driver's perspective 210 may be important for providing the driving instruction sentence 213. For example, an ambulance may be approaching from behind the vehicle and, therefore, hidden from the direct view of the driver. The sentence generation module 212 may generate a driving instruction sentence 213 that provides a warning to the driver about the approaching ambulance. It is to be understood that the dynamic map is continuously updated based on the real-time sensor information 203 and from moment to moment the state of the viewing volume 211 can change.

The sentence generation module 212 performs the operation of generating the driving instruction sentence 213 given the driving route 202, the viewing volume 211 and the dynamic map 206. The sentence generation module 212 uses a parametric function to select among the set of static salient objects 207 and dynamic salient objects 208 in the dynamic map 206 a small subset of objects that are most salient for generating the driving instruction sentence 213. Broadly speaking, the most salient object will tend to be larger, and more unique in color or location so as to enable the driver to quickly observe it.

The sentence generation module 212 may be implemented by a number of different parametric functions. One possible parametric function for implementing the sentence generation module 212 is through the use of template-based driving commands, also known simply as driving command. An example of a template-based driving command is "Follow the <attribute><salient object> turning <direction> ahead." In the preceding example, <attribute>, <salient object>, and <direction> are template slots that the sentence generation module 212 fills to produce the driving instruction sentence 213. In this case <attribute> is one or more of the attributes of the salient object, and <direction> is the next turning direction in the driving route 202. A specific example of a template-based driving command of this type is "Follow the large, brown, box truck turning left ahead." In this specific example "large", "brown" and "box" are attributes of "truck" which has turned "left" in the same direction as the next turning direction of the driving route 202. Many possible template-based driving commands are possible including, for example, "Turn <direction> before the <attribute><salient object>", "Turn <direction> after the <attribute><salient object>", "Merge to the <direction>", "Drive toward the <attribute><salient object>", "Stop at the <attribute><salient object>", and "Park near the <attribute><salient object>". The words "before", "after", and "near" are used to indicate a relative spatial relationship between the salient object and the route. For example, "Turn right before the large green sculpture." It should be understood that the preceding list is not comprehensive and that many additional variations of template-based driving commands are possible including some that provide a driving instruction sentence 213 that includes more than one salient object.

Figure 3:
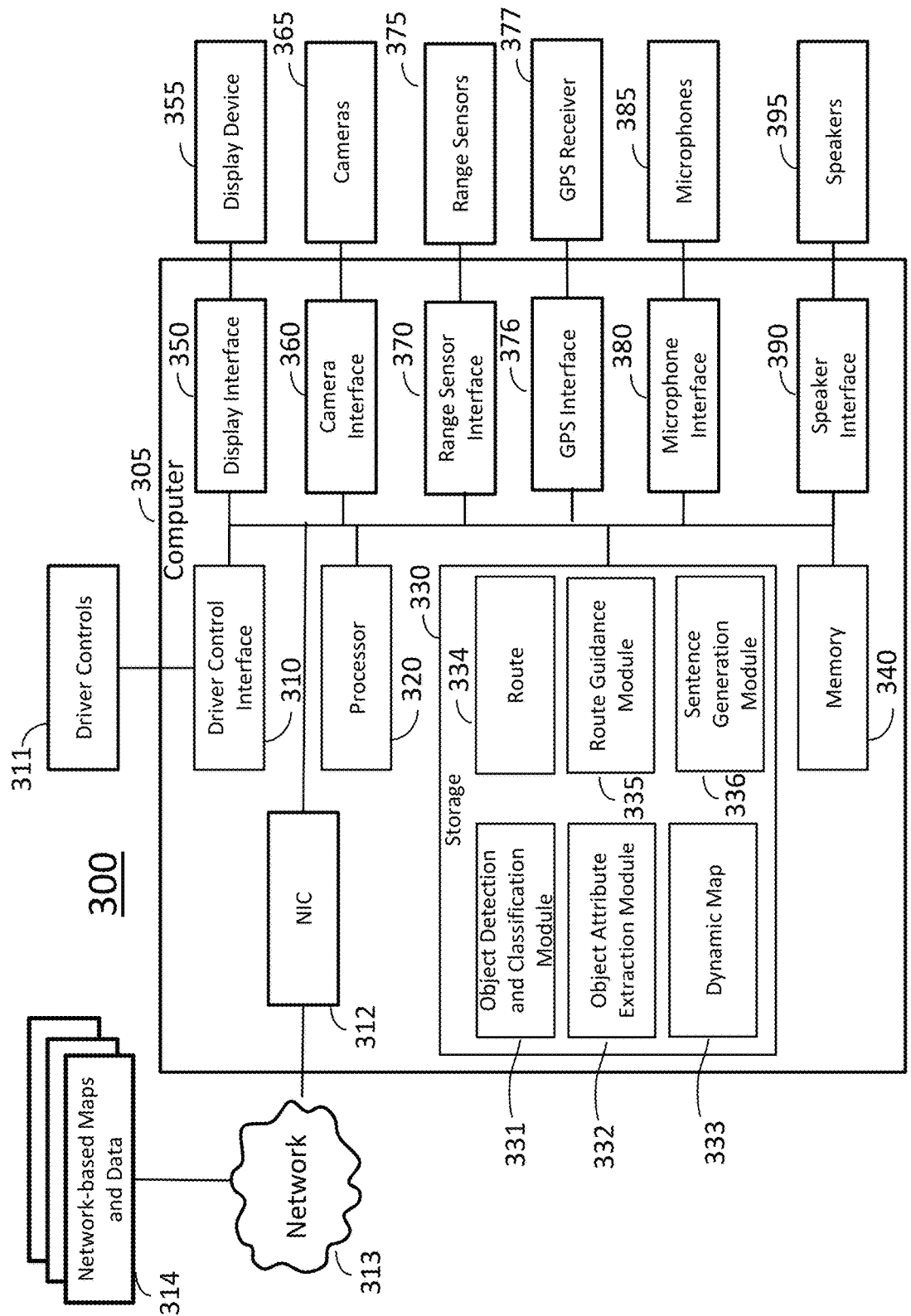
FIG. 3 is a block diagram of a computer that accepts input from a number of sources and sensors, and outputs information to a display or speakers, according to some embodiments of the present disclosure.

FIG. 3 is a block diagram of the route guidance system 300 of the present invention. The route guidance system is implemented in a computer 305 that may interface to one or more peripheral devices as needed to function. A driver control interface 310 interfaces the computer 305 to one or more driver controls 311 that may include, for example, buttons on the vehicle's steering wheel, and enable the driver to provide one form of input to the route guidance system 300. A display interface 350 interfaces the computer 305 to one or more display devices 355 that may include, for example, an instrument cluster mounted display or a center console mounted display, and enable the route guidance system to display visual output to the driver. A camera interface 360 interfaces the computer 305 to one or more cameras 365, one of which is positioned so as to receive light from the front exterior vicinity of the vehicle. Another camera 365 may be positioned so as to receive light from the vehicle interior to enable the route guidance system 300 to observe the driver's face and actions to enable another form of input. A range sensor interface 370 interfaces the computer 305 to one or more range sensors 375 that may include, for example, exterior facing front, side or back looking radars and Lidars, enabling the route guidance system to obtain 3D information about the vicinity of the vehicle including the distance to nearby objects. Additionally, the range sensors 375 may include one or more interior facing radar sensors and Lidars, which enable the route guidance system to obtain 3D information about the driver's action to enable yet another form of input to the system 300. A GPS interface 376 interfaces the computer 305 to a GPS receiver 377 capable of receiving GPS signals that provide the current real-time position of the vehicle. A microphone interface 380 interfaces the computer 305 to one or more microphones 385 that may be, for example, on the exterior of the vehicle to enable receiving sound signals from the exterior of the vehicle, as well as one or more microphones 385 on the interior of the vehicle to enable receiving sound signals from the interior of the vehicle including the driver's speech. A speaker interface 390 interfaces the computer 305 to one or more speakers 395 to enable the system 300 to emit audible outputs to the driver that may include, for example, the driving instruction 213 rendered by a speech synthesizer into audible form. Taken together, the driver controls 311, the cameras 365, range sensors 375, GPS receiver 377, and microphones 385 constitute the real-time sensors that provide the real-time information 203 as described previously.

The computer 305 may be equipped with a network interface controller (NIC) 312 that enables the system 300 to exchange information from a network 313 that may include, for example, the internet. The exchanged information may include network-based maps and other data 314 such as the location and attributes of static objects in the vicinity of the vehicle. The computer is equipped with a processor 320 that performs the actual algorithms needed to implement the route guidance system 300 as well as storage 330 that is some form of computer memory that may be, for example, dynamic random access memory (DRAM), hard disk drive (HDD), or solid state drive (SSD). The storage 330 can be used for many purposes including but not limited to, storing the object detection and classification module 331, the object attribute extraction module 332, the dynamic map 333, the route, 334, the route guidance module 335 and the sentence generation module 336. In addition, the computer 305 has working memory 340 that is used to store temporary data used by the various modules and interfaces.

Multimodal Attention Method

Figure 4:
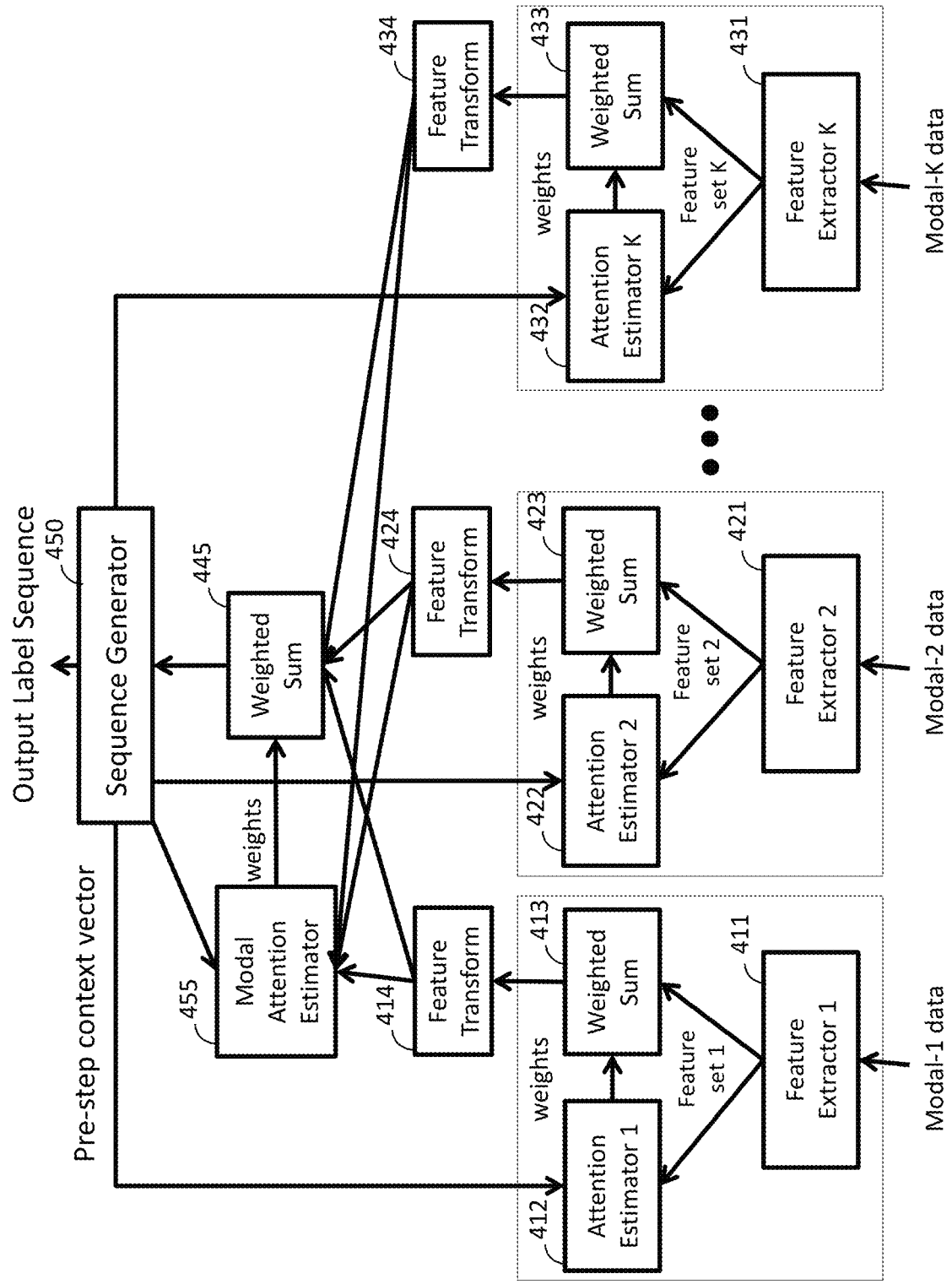
FIG. 4 is a block diagram illustrating the multimodal attention method according to embodiments of the present disclosure.

A sentence generator with a multimodal fusion model may be constructed based on a multimodal attention method. FIG. 4 is a block diagram illustrating the multimodal attention method according to embodiments of the present disclosure. In addition to the feature extractors 1~K, the attention estimators 1~K, the weighted sum processors 1~K, the feature transformation modules 1~K, and the Sequence Generator 450, the multimodal attention method further includes a modal attention estimator 455 and a weighted sum processor 445 instead of using the simple sum processor (not shown). The multimodal attention method is performed in combination of the sequence generation model (not shown), the feature extraction model (not shown) and the multimodal fusion model (not shown). In both methods, the sequence generation model may provide the Sequence Generator 450 and the feature extraction model may provide the feature extractors 1~K (411, 421, 431). Further, the feature transformation modules 1~K (414, 424, 434), the modal attention estimator 455 and the weighted sum processors 1~K (413, 423, 433) and the weighted sum processor 445 may be provided by the multimodal fusion model.

Given multimodal video data including K modalities such that K≥2 and some of the modalities may be the same, Modal-1 data are converted to a fixed-dimensional content vector using the feature extractor 411, the attention estimator 412 and the weighted-sum processor 413 for the data, where the feature extractor 411 extracts multiple feature vectors from the data, the attention estimator 412 estimates each weight for each extracted feature vector, and the weighted-sum processor 413 outputs (generates) the content vector computed as a weighted sum of the extracted feature vectors with the estimated weights. Modal-2 data are converted to a fixed-dimensional content vector using the feature extractor 421, the attention estimator 422 and the weighted-sum processor 423 for the data. Until Modal-K data, K fixed-dimensional content vectors are obtained, where the feature extractor 431, the attention estimator 432 and the weighted-sum processor 433 are used for Modal-K data. Each of Modal-1, Modal-2, . . . , Modal-K data may be sequential data in a time sequential order with an interval or other predetermined orders with predetermined time intervals.

Each of the K content vectors is then transformed (converted) into an N-dimensional vector by each feature transformation modules 414, 424, and 434, and K transformed N-dimensional vectors are obtained, where N is a predefined positive integer.

The K transformed N-dimensional vectors are summed into a single N-dimensional content vector in the simple multimodal method of FIG. 4, whereas the vectors are converted to a single N-dimensional content vector using the modal attention estimator 455 and the weighted-sum processor 445 in the multimodal attention method, wherein the modal attention estimator 455 estimates each weight for each transformed N-dimensional vector, and the weighted-sum processor 445 outputs (generates) the N-dimensional content vector computed as a weighted sum of the K transformed N-dimensional vectors with the estimated weights.

The Sequence Generator 450 receives the single N-dimensional content vector and predicts one label corresponding to a word of a sentence that describes the video data.

For predicting the next word, the Sequence Generator 450 provides contextual information of the sentence, such as a vector that represents the previously-generated words, to the attention estimators 412, 422, 432 and the modal attention estimator 455 for estimating the attention weights to obtain appropriate content vectors. The vector may be referred to as a pre-step (or prestep) context vector.

The Sequence Generator 450 predicts the next word beginning with the start-of-sentence token, "<sos>," and generates a descriptive sentence or sentences by predicting the next word (predicted word) iteratively until a special symbol "<eos>" corresponding to "end of sentence" is predicted. In other words, the Sequence Generator 450 generates a word sequence from multi-modal input vectors. In some cases, the multi-modal input vectors may be received via different input/output interface such as the HMI and I/O interface (not shown) or one or more I/O interfaces (not shown).

In each generating process, a predicted word is generated to have a highest probability in all possible words given from the weighted content vector and the prestep context vector. Further, the predicted word can be accumulated into the memory 340, the storage device 330 or more storage devices (not shown) to generate the word sequence, and this accumulation process can be continued until the special symbol (end of sequence) is received. The system 300 can transmit the predicted words generated from the Sequence Generator 450 via the NIC and the network, the HMI and I/O interface or one or more I/O interfaces, so that the data of the predicted words can be used by other computers (not shown) or other output devices (not shown).

When each of the K content vectors comes from a distinct modality data and/or through a distinct feature extractor, modality or feature fusion with the weighted-sum of the K transformed vectors enables a better prediction of each word by paying attention to different modalities and/or different features according to the contextual information of the sentence. Thus, this multimodal attention method can utilize different features inclusively or selectively using attention weights over different modalities or features to infer each word of the description.

Further, the multimodal fusion model in the system 300 may include a data distribution module (not shown), which receives multiple time-sequential data via the I/O interface and distributes the received data into Modal-1, Modal-2, . . . , Modal-K data, divides each distributed time-sequential data according to a mined interval or intervals, and then provides the Modal-1, Modal-2, . . . , Modal-K data to the feature extractors 1~K, respectively.

In some cases, the multiple time-sequential data may be video signals captured by a camera and audio signals recorded with a microphone. When time-sequential depth images obtained by a range sensor are used for Modal data, the system 300 uses the feature extractors 411, 421 and 431 (set K=3) in the figure. The real-time multimodal information, which can include images (frames) from at least one camera, signals from a measurement system, communication data from at least one neighboring vehicle, or sound signals via at least one microphone arranged in the vehicle, is provided to the feature extractors 411, 421 and 431 in the system 300 via the camera interface 360, the range sensor interface 370, or the microphone interface 380. The feature extractors 411, 421 and 431 can extract image data, audio data and depth data, respectively, as Modal-1 data, Modal-2 data and Modal-3 (e.g. K=3). In this case, the feature extractors 411, 421 and 431 receive Modal-1 data, Modal-2 data and Modal-3 according to first, second and third intervals, respectively, from data stream of the real-time images (frames).

In some cases, the data distribution module may divide the multiple time-sequential data with predetermined different time intervals, respectively, when image features, motion features, or audio features can be captured with different time intervals.

In some cases, one or a combination of an object detector, an object classifier, a motion trajectory estimator, and an object attribute extractor may be used as one of the feature extractors, that receives time-sequential data with a predetermined time interval via Camera Interface 360, Range Sensor Interface 370, or Microphone Interface 380, and generates a sequence of feature vectors including the information of the detected objects such as object location, object class, object attribute, object motion, and intersection location.

Example of a Multimodal Fusion Model

An approach to sentence generation can be based on multimodal sequence-to-sequence learning. Embodiments of the present disclosure provide an attention model to handle fusion of multiple modalities, where each modality has its own sequence of feature vectors. For sentence generation, multimodal inputs such as image features, motion features, and audio features are available. Furthermore, combination of multiple features from different feature extraction methods are often effective to improve the sentence quality.

Figure 5:
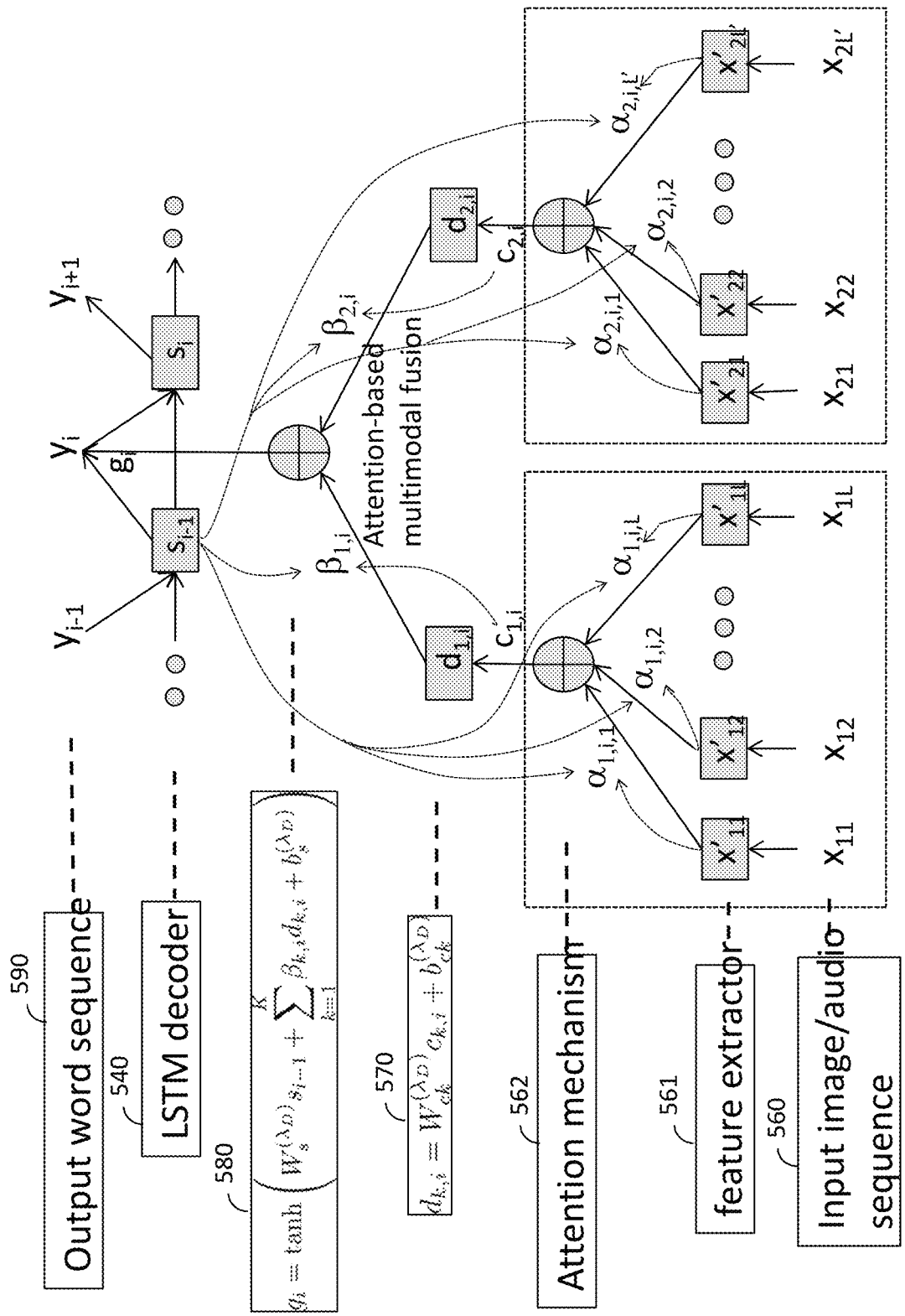
FIG. 5 is a block diagram illustrating an example of the multimodal fusion method (the multimodal feature fusion approach) for sentence generation, according to embodiments of the present disclosure.

FIG. 5 is a block diagram illustrating an example of the multimodal fusion method (the multimodal feature fusion approach) for sentence generation, assuming K=2. The input image/audio sequence 560 may be a time sequential order with predetermined time intervals. The input sequence of feature vectors is obtained using one or more feature extractors 561.

Given input image/audio sequences 560, where one may be a sequence of images, $X_1 = x_{11}, x_{12}, \ldots, x_{1L}$, and the other may be a sequence of audio signals, $X_2 = x_{21}, x_{22}, \ldots, x_{2L'}$, each image or audio signal is first fed to a corresponding feature extractor 561 for images or audio signals. For images, the feature extractor can be a pretrained Convolutional Neural Network (CNN) such as GoogLeNet, VGG-Net, or C3D, where each feature vector may be obtained by extracting the activation vector of a fully-connected layer of the CNN for each input image. The sequence of image feature vectors $X'_1$ is shown as $x'_{11}, x'_{12}, \ldots, x'_{1L}$ in FIG. 5. For audio signals, the feature extractor can be a mel-frequency analysis method, which generates Mel-Frequency Cepstrum Coefficients (MFCC) as feature vectors. The sequence of audio feature vectors $X'_2$ is shown as $x'_{21}, x'_{22}, \ldots, x'_{2L'}$ in FIG. 5.

The multimodal fusion method may employ an encoder based on a bidirectional long short-term memory (BLSTM) or Gated Recurrent Units (GRU) to further convert the feature vector sequence so that each vector contains its contextual information. In real-time image description tasks, however, CNN-based features may be used directly, or one more feed-forward layer may be added to reduce the dimensionality.

If an BLSTM encoder is used following the feature extraction, then the activation vectors (i.e., encoder states) can be obtained as $$h_t = \begin{bmatrix} h_t^{(f)} \\ h_t^{(b)} \end{bmatrix}, \quad (1)$$

where $h_t^{(f)}$ and $h_t^{(b)}$ are the forward and backward hidden activation vectors:

$$h_t^{(f)} = \text{LSTM}(h_{t-1}^{(f)}, x'_t; \lambda_E^{(f)}) \quad (2)$$

$$h_t^{(b)} = \text{LSTM}(h_{t+1}^{(b)}, x'_t; \lambda_E^{(b)}). \quad (3)$$

A hidden state of the LSTM is given by $$h_t = \text{LSTM}(h_{t-1}, x'_t; \lambda_E), \quad (2)$$

where the LSTM function of the encoder network $\lambda_E$, which can be a forward LSTM network $\lambda_E^{(f)}$ or a backward LSTM network $\lambda_E^{(b)}$, is computed as $$\text{LSTM}(h_{t-1}, x_t; \lambda) = o_t \tanh(c_t) \quad (5)$$

where $o_t = \sigma(W_{xo}^{(\lambda)} x_t + W_{ho}^{(\lambda)} h_{t-1} + b_o^{(\lambda)})$ (6)

$$c_t = f_t c_{t-1} + i_t \tanh(W_{xc}^{(\lambda)} x_t + W_{hc}^{(\lambda)} h_{t-1} + b_c^{(\lambda)}) \quad (7)$$

$$f_t = \sigma(W_{xf}^{(\lambda)} x_t + W_{hf}^{(\lambda)} h_{t-1} + b_f^{(\lambda)}) \quad (8)$$

$$i_t = \sigma(W_{xi}^{(\lambda)} x_t + W_{hi}^{(\lambda)} h_{t-1} + b_i^{(\lambda)}), \quad (9)$$

where $\sigma(\ )$ is the element-wise sigmoid function, and $i_t$, $f_t$, $o_t$ and $c_t$ are, respectively, the input gate, forget gate, output gate, and cell activation vectors for the t-th input vector. The weight matrices $W_{zz}^{(\lambda)}$ and the bias vectors $b_z^{(\lambda)}$ are identified by the subscript $z \in \{X, h, i, f, o, c\}$. For example, $W_{hi}$ is the hidden-input gate matrix and $W_{xo}$ is the input-output gate matrix. Peephole connections are not used in this procedure.

If a feed-forward layer is used, then the activation vector is calculated as $$h_t = \tanh(W_p x'_t + b_p), \quad (10)$$

where $W_p$ is a weight matrix and $b_p$ is a bias vector. Further, when the CNN features are directly used, then it is assumed to be $h_t = x_t$.

a. The attention mechanism 562 is realized by using attention weights to the hidden activation vectors throughout the input sequence 560 or the feature vector sequence extracted by the feature extractor 561. These weights enable the network to emphasize features from those time steps that are most important for predicting the next output word.

b. Let $\alpha_{i,t}$ be an attention weight between the $i_{th}$ output word and the $t_{th}$ input feature vector. For the $i_{th}$ output, the context vector $c_i$ representing the relevant content of the input sequence is obtained as a weighted sum of hidden unit activation vectors:

$$c_i = \sum_{t=1}^{L} \alpha_{i,t} h_i, \quad (11)$$

The attention weights may be computed as $$\alpha_{i,t} = \frac{\exp(e_{i,t})}{\sum_{\tau=1}^{L} \exp(e_{i,\tau})} \quad (12)$$

and $$e_{i,t} = w_A^T \tanh(W_A s_{i-1} + V_A h_t + b_A), \quad (13)$$

where $W_A$ and $V_A$ are matrices, $w_A$ and $b_A$ are vectors, and $e_{i,t}$ is a scalar.

In FIG. 5, this attention mechanism is applied to each modality, where $c_{1,i}$ and $c_{2,i}$ represent the context vectors obtained from the first and second modalities, respectively.

The attention mechanism is further applied for multimodal fusion. Using the multimodal attention mechanism, based on the previous decoder state $s_{i-1}$, the LSTM decoder 540 can selectively attend to specific modalities of input (or specific feature types) to predict the next word. The attention-based feature fusion in accordance with embodiments of the present disclosure may be performed using $$g_i = \tanh\left(W_s^{(\lambda_D)} s_{i-1} + \sum_{k=1}^{K} \beta_{k,i} d_{k,i} + b_s^{(\lambda_D)}\right) \quad (14)$$

to generate multimodal context vector $g_i$, 580, where $W_s^{(\lambda_D)}$ is a matrix, and $d_{k,i}$ is a transformed context vector 570 obtained from the k-th context vector $c_{k,i}$ corresponding to the k-th feature extractor or modality, which is computed as $$d_{k,i} = W_{ck}^{(\lambda_D)} c_{k,i} + b_{ck}^{(\lambda_D)}, \quad (15)$$

where $W_{ck}^{(\lambda_D)}$ is a matrix and $b_{ck}^{(\lambda_D)}$ is a vector. The multimodal context vector $g_i$, 580, is then fed to the LSTM decoder 540. The multimodal attention weights $\beta_{k,i}$ are obtained in a similar way to the temporal attention mechanism of Eqs. (11), (12), and (13):

$$\beta_{k,i} = \frac{\exp(v_{k,i})}{\sum_{k=1}^{K} \exp(v_{k,i})}, \quad (16)$$

where $$v_{k,i} = w_B^T \tanh(W_B s_{i-1} + V_{Bk} c_{k,i} + b_{Bk}), \quad (17)$$

and $W_B$ and $V_{Bk}$ are matrices, $w_B$ and $b_{Bk}$ are vectors, and $v_{k,i}$ is a scalar.

The LSTM decoder 540 employs a LSTM-based decoder network $\lambda_D$, which generates an output word sequence 590 with multimodal context vectors $g_i$ (i=1, . . . , M+1). The decoder predicts the next word iteratively beginning with the start-of-sentence token, "<sos>" until it predicts the end-of-sentence token, "<eos>." The start-of-sentence token may be referred to as a start label, and the end-of sentence token may be referred to as an end label.

Given decoder state $s_{i-1}$ and multimodal context vector $g_i$, the LSTM decoder 540 infers the next word probability distribution as $$P(y|s_{i-1}, g_i) = \mathrm{softmax}(W_o^{(\lambda_D)} s_{i-1} + W_g^{(\lambda_D)} g_i + b_o^{(\lambda_D)}), \quad (18)$$

where $W_o^{(\lambda_D)}$ and $W_g^{(\lambda_D)}$ are matrices, and $b_o^{(\lambda_D)}$ is a vector.

And the decoder predicts the next word $y_i$, which has the highest probability, according to $$y_i = \mathrm{argmax}_{y \in U} P(y|s_{i-1}, g_i), \quad (19)$$

where U denotes the vocabulary. The decoder state is updated using the LSTM network of the decoder as $$s_i = \mathrm{LSTM}(s_{i-1}, y'_i; \lambda_D), \quad (20)$$

where $y'_i$ is a word-embedding vector of $y_i$, and the initial state $s_0$ is set to a zero vector and $y'_0$ is given as a word-embedding vector for the start label <sos>. In the training phase, $Y = y_1, \ldots, y_M$ is given as the reference to determine the matrices and vectors represented with W, V, w, and b in Eqs. (1) to (20). However, in the test phase, the best word sequence needs to be found based on $$\hat{Y} = \mathrm{arg\,max}_{Y \in U^*} P(Y|X) = \mathrm{argmax}_{y_1, \ldots, y_M \in U^*} P(y_1|s_0, g_1) \quad (21)$$
$$P(y_2|s_1, g_2) \ldots P(y_M|s_{M-1}, g_M) P(<eos>|s_M, g_{M+1}).$$

Accordingly, a beam search method in the test phase can be used to keep multiple states and hypotheses with the highest cumulative probabilities at each i-th step, and select the best hypothesis from those having reached the end-of-sentence token.

Example Descriptions of Sentence Generation for a Scene-Aware Interaction Navigation System For designing a scene-aware interaction navigation systems, according to some embodiments of the present invention, real-time images captured by a camera on a vehicle may be used to generate navigation sentences for a human driver of the vehicle. In this case, the object detection and classification module 331, the object attribute extraction module 332, and a motion trajectory estimation module (not shown) may be used as feature extractors for the sentence generator.

The object detection and classification module 311 may detect multiple salient objects from each image, wherein a bounding box and object class are predicted for each object. The bounding box indicates the location of the object in the image, which is represented as a four-dimensional vector ($x_1$, $y_1$, $x_2$, $y_2$), where $x_1$ and $y_1$ represent the coordinate point of the upper left corner of the object in the image, and $x_2$ and $y_2$ represent the coordinate point of the lower right corner of the object in the image.

The object class identifier is an integer number that indicates a predefined object class such as building, sign, pole, traffic light, tree, person, bike, bus, and car. The object class identifier can be represented as a one-hot vector. The object attribute extraction module 332 may estimate the attribute of each object, wherein an attribute can be shape, color, and state of the object such as tall, wide, large, red, blue, white, black, walking, and standing. The attribute is predicted as an attribute identifier, which is a predetermined integer number for each attribute. The attribute identifier can be represented as a one-hot vector. The motion trajectory estimation module (not shown) may estimate a motion vector for each object using previously received images, wherein the motion vector may include the direction and speed of the object in 2D image and be represented as a 2-dimensional vector. The motion vector may be estimated using the differences of the location of the same object in the previously received images. The object detection and classification module 331 may also detect a road intersection and provide a four-dimensional vector representing the bounding box of the road intersection. With these prementioned modules, a feature vector for each detected object can be constructed by concatenating the vectors of bounding boxes of the object and the road intersection, the one-hot vectors of the object class identifier and the attribute identifier, and the motion vector of the object.

For multiple objects, the feature vectors can be considered different vectors from different feature extractors. The multimodal fusion method can be used to fuse the feature vectors from the multiple objects. In this case, a sequence of feature vectors for each object is constructed by assigning a feature vector of an object detected in the current image to the most overlapping object detected in the previous image. The degree of the overlapping between two objects may be computed using the Intersection-over-Union (IoU) measure:

$$IoU(A, B) = \frac{|A \cap B|}{|A \cup B|}, \quad (22)$$

where $|A \cap B|$ and $|A \cup B|$ are the areas of intersection and union between two objects A and B, respectively. If the bounding box of A is $(x_1^A, y_1^A, x_2^A, y_2^A)$ and the bounding box of B is $(x_1^B, y_1^B, x_2^B, y_2^B)$, the intersection and the union can be computed as:

$$|A \cap B| = \max(\min(x_2^A, x_2^B) - \max(x_1^A, x_1^B), 0) \times \max(\min(y_2^A, y_2^B) - \max(y_1^A, y_1^B), 0) \quad (23)$$

$$|A \cup B| = (x_2^A - x_1^A)(y_2^A - y_1^A) + (x_2^B - x_1^B)(y_2^B - y_1^B) - |A \cap B|. \quad (24)$$

Suppose $I_1, I_2, \ldots, I_t$ denotes a time-sequential image data up to the current time frame t. A $\tau$-length feature vector sequence, $x_{o1}^{(t)}, \ldots, x_{o\tau}^{(t)}$ ($\tau \leq t$), for an object o can be obtained as follows.

$$x_{o1}^{(t)} = F(o_1) o_1 = o, \exists o \in O(I_{t-\tau+1}), \quad (25)$$

$$x_{os}^{(t)} = F(o_s) \ o_s = \underset{o' \in O(I_{t-\tau+s})}{\operatorname{argmax}} IoU(o', o_{s-1}), \ 2 \leq s \leq \tau, \quad (26)$$

where O(I) denotes a set of detected objects from image I, and F(o) is a function to extract a feature vector from object o. If there is no overlapped object in the previous image, a zero vector may be used, i.e., if $$\underset{o' \in O(I_{t-\tau+s})}{\max} IoU(o', o_{s-1}) < \beta, \text{ then } x_{os}^{(t)} = 0^d,$$

where $\beta$ is a predetermined threshold to ignore very small overlaps and d denotes the number of dimensions of the feature vectors. According to Eqs. (21) and (22), multiple feature vector sequences can be obtained by starting each sequence with every object in $O(I_{t-\tau+1})$.

For example, Faster R-CNN (Ren, Shaoqing, et al. "Faster R-CNN: Towards real-time object detection with region proposal networks," *Advances in neural information processing systems*, 2015) is a known prior art method that may be used in the object detection and classification module 331 and the object attribute extraction module 332.

When a given route indicates that the vehicle will turn right at the next intersection, the system may generate a sentence like "Turn right at the intersection before the black building." To generate this kind of sentences, information about the direction to turn may be added to the feature vector. In this case, the direction may be represented as a 3-dimensional one-hot vector such that (1,0,0)=turn left,
(0,1,0)=go straight,
(0,0,1)=turn right,
(0,0,0)=no intersection.

This direction vector may be concatenated to each feature vector extracted from each object.

Moreover, to configure a voice dialog system to accept voice requests from the driver and output voice responses to the driver, a voice recognition system and a text-to-speech synthesis system may be included in the system. In this case, the text sentence given as a result of voice recognition for the driver's request can be fed to the sentence generation module 336, where the sentence may be one of multimodal inputs (i.e. Modal-k data, where k is an integer such that $1 \leq k \leq K$) for the multimodal fusion method in FIG. 4. Each word in the sentence can be converted to a fixed dimensional word embedding vector, and therefore the text sentence can be represented as a feature vector sequence. Using the feature vector sequences extracted from the driver's request and the detected objects, the multimodal fusion method can generate a reasonable sentence as a response to the driver. The generated sentence can be converted further to voice signal by the text-to-speech synthesis system to output the signal via some audio speakers.

Setup for Training the Sentence Generation Model

To learn the attention-based sentence generator with a multimodal fusion model, scene-aware interaction data were created, where 21,567 images were obtained from a camera attached to the dashboard of a car. Then the images were annotated by human subjects, where 36,935 object-intersection pairs were labeled with their object names, attributes, bounding boxes, and sentences to navigate car drivers. The data contained 2,658 unique objects and 8,970 unique sentences.

The sentence generation model, i.e. the decoder network, is trained to minimize the cross-entropy criterion using the training set. Image features are fed to the BLSTM encoder followed by the decoder network. The encoder network has two BLSTM layers of 100 cells. The decoder network has one LSTM layer with 100 cells. Each word is embedded to a 50-dimensional vector when it is fed to the LSTM layer. We apply the AdaDelta optimizer (M. D. Zeiler. ADADELTA: An adaptive learning rate method. CoRR, abs/1212.5701, 2012.) to update the parameters, which is widely used for optimizing attention models. The LSTM and attention models were implemented using PyTorch (Paszke, Adam, et al. "PyTorch: An imperative style, high-performance deep learning library." Advances in Neural Information Processing Systems. 2019).

Figure 6A:
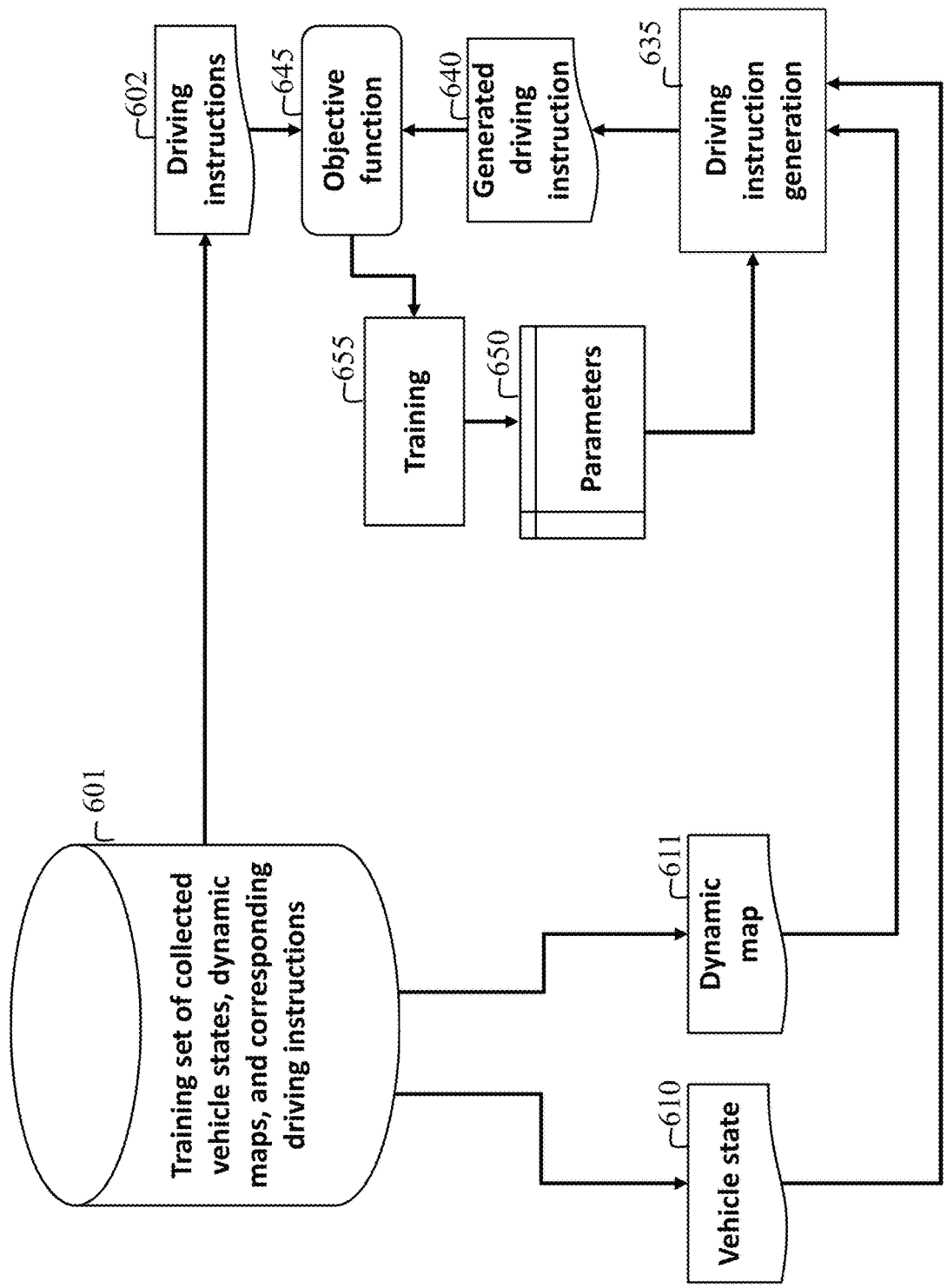
FIG. 6A is a flow diagram illustrating training of a parametric function of a navigation system configured to generate driving instructions based on a state of the vehicle and a dynamic map, according to embodiments of the present disclosure.

FIG. 6A is a flow diagram illustrating training of a parametric function 635 of a navigation system 600A configured to generate driving instructions 640 based on a state of the vehicle 610 and a dynamic map 611, according to embodiments of the present disclosure. For example, the parametric function 635 can be implemented as a neural network with parameters included in a set of parameters 650, or as a rule-based system also involving parameters included in a set of parameters 650. Training can be performed by considering a training set 601 of training data examples including combinations of observed vehicle states 610, observed dynamic maps 611, and corresponding driving instructions 602. The training data examples may be collected by driving a vehicle in various conditions, recording observed vehicle states 610 and observed dynamic maps 611, and collecting corresponding driving instructions 602 as labels by asking humans to give examples of driving instructions that they consider relevant for guiding a driver in a situation corresponding to the current vehicle state and dynamic map. Multiple humans may be asked to provide one or more examples of driving instructions that they consider particularly suitable as a hypothetical driving instruction in the current situation based on how much the driving instruction can be considered intuitive, natural, relevant, easily understandable, clear, etc., in order to help a driver safely follow an intended route that the navigation system is attempting to guide the driver on. The corresponding driving instructions may be collected by a passenger as the vehicle is being driven, or offline, by showing examples of vehicle states and dynamic maps to human labelers who annotate them with corresponding driving instructions. For example, if a vehicle collecting training data encountered an intersection in which a black car is turning right ahead of the vehicle on the intended route that the navigation system is attempting to guide the driver on, a human labeler may be shown a video clip from a dashboard camera of the vehicle showing the moment where the black car turned right and an indication that the intended route implies turning right at that intersection, and label this moment with a corresponding driving instruction such as "Follow the black car turning right". For example, if the human labeler notices a potential hazard that may impact the ability to safely turn right such as pedestrians attempting to cross a street on the future path of the vehicle, the labeler may label that moment with a corresponding driving instruction such as "Beware of the pedestrians attempting to cross the street". An objective function computation module 645 computes an objective function by computing an error function between the generated driving instruction 640 and the training driving instructions 602. The error function may be based on a measure of similarity, a cross-entropy criterion, etc. The objective function can be used by a training module 655 to update the parameters 650. In the case where the parametric function 635 is implemented as a neural network, the training module 655 is a network training module and the parameters 650 include network parameters. In the case where the parametric function 635 is implemented as a rule-based system, parameters 650 include parameters of the rule-based system such as weights and thresholds that may be modified using a training module 655 to minimize or decrease the objective function 645 on the training set 601.

Figure 6B:
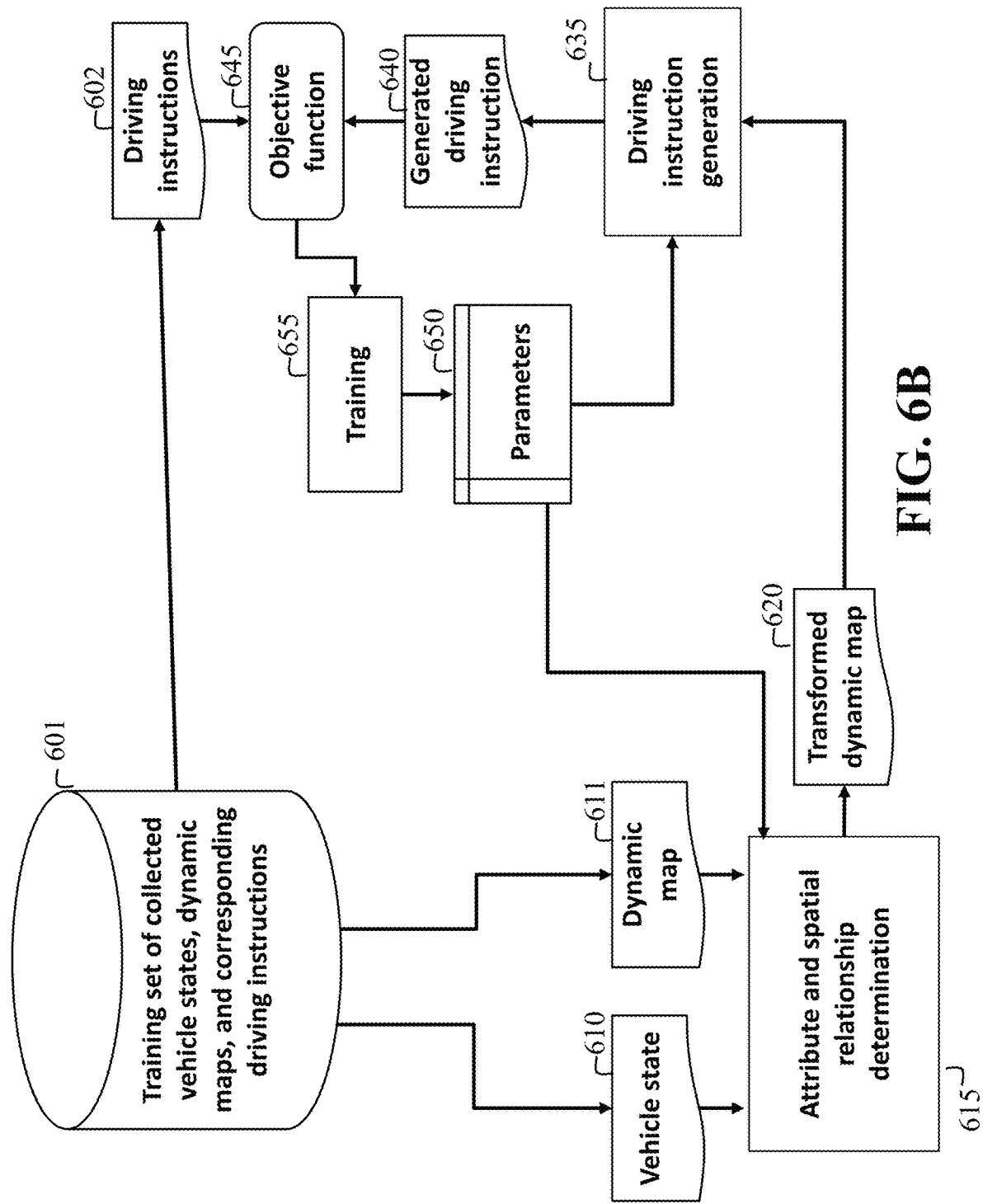
FIG. 6B is a flow diagram illustrating training of parametric functions of a navigation system, a first parametric function being configured to determine attributes and spatial relationships of a set of salient objects of a dynamic map based on a state of a vehicle to obtain a transformed dynamic map, and a second parametric function being configured to generate driving instructions based on the transformed dynamic map, according to embodiments of the present disclosure.

FIG. 6B is a flow diagram illustrating training of parametric functions of a navigation system 600B, a first parametric function 615 being configured to determine attributes and spatial relationships of a set of salient objects of a dynamic map 611 based on a state of a vehicle 610 to obtain a transformed dynamic map 620, and a second parametric function 635 being configured to generate driving instructions 640 based on the transformed dynamic map 620, according to embodiments of the present disclosure. For example, the first parametric function 615 can be implemented as a neural network with parameters included in a set of parameters 650, or as a rule-based system also involving parameters included in a set of parameters 650, and the second parametric function 635 can be implemented as a neural network with parameters included in a set of parameters 650, or as a rule-based system also involving parameters included in a set of parameters 650. Training can be performed in a similar way as in the system of FIG. 6a, where the parameters 650 here also include parameters of the first parametric function 615, which can also be trained using a training module 655 based on an objective function 645 obtained by comparing the generated driving instruction 640 with the training driving instructions 602.

Figure 6C:
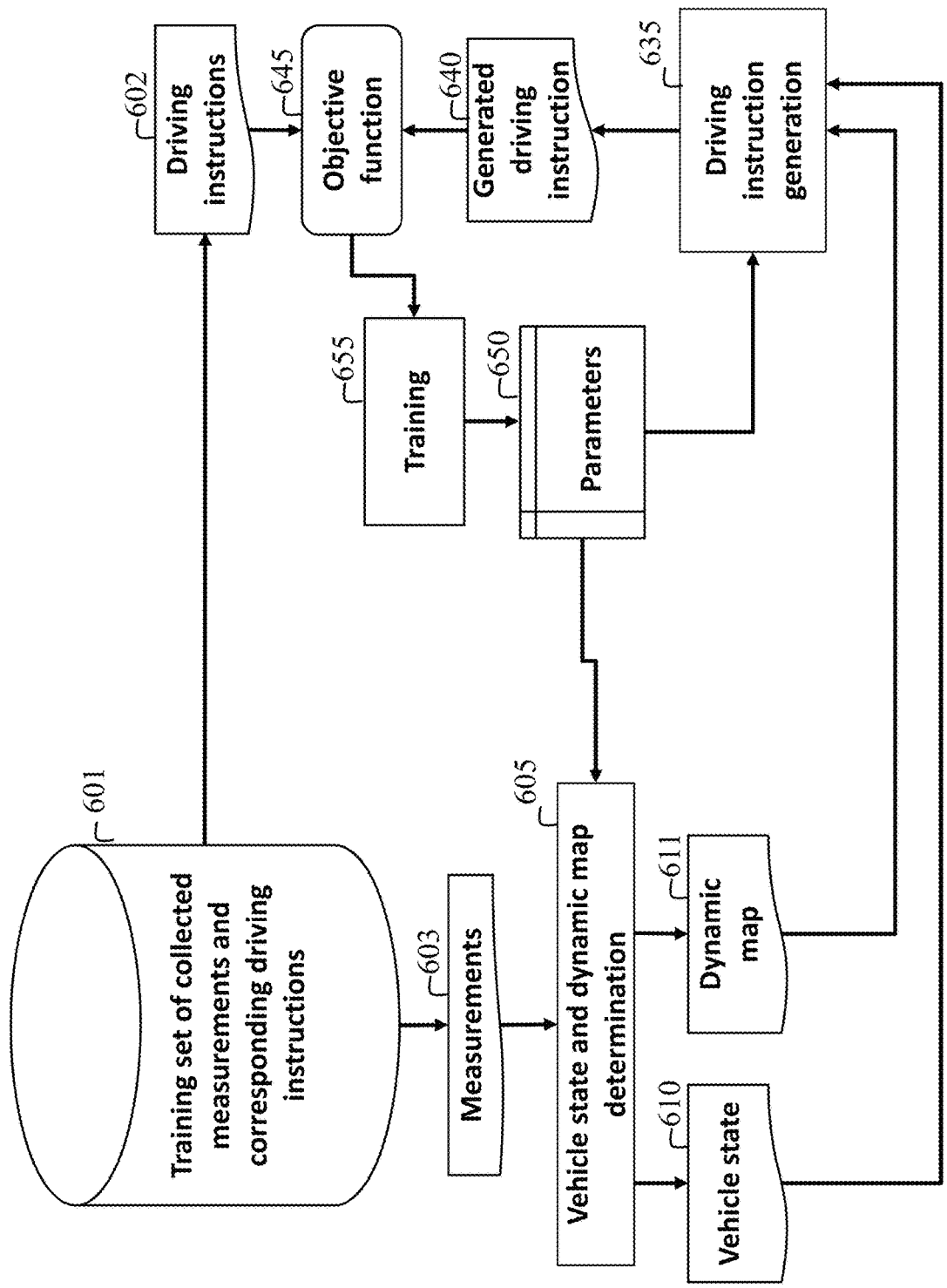
FIG. 6C is a flow diagram illustrating training of parametric functions of a navigation system, a first parametric function being configured to determine a state of the vehicle and a dynamic map based on measurements from a scene, and a second parametric function being configured to generate driving instructions based on the vehicle state and the dynamic map, according to embodiments of the present disclosure.

FIG. 6C is a flow diagram illustrating training of parametric functions of a navigation system 600C, a first parametric function 605 being configured to determine a state of the vehicle 610 and a dynamic map 611 based on measurements 603 from a scene, and a second parametric function 635 being configured to generate driving instructions 640 based on the vehicle state 610 and the dynamic map 611, according to embodiments of the present disclosure. For example, the first parametric function 605 can be implemented as a neural network with parameters included in a set of parameters 650, or as a rule-based system also involving parameters included in a set of parameters 650. Training can be performed by considering a training set 601 of collected training data examples including combinations of observed measurements 603, and corresponding driving instructions 602. The training data examples may be collected by driving a vehicle in various conditions, recording observed measurements 603 of a scene, and collecting corresponding driving instructions 602 in a similar way as in the system of FIG. 6A. Given training set 601, training can be performed in a similar way as in the system of FIG. 6A, where the parameters 650 here also include parameters of the first parametric function 605, which can also be trained using a training module 655 based on an objective function 645 obtained by comparing the generated driving instruction 640 with the training driving instructions 602.

Figure 6D:
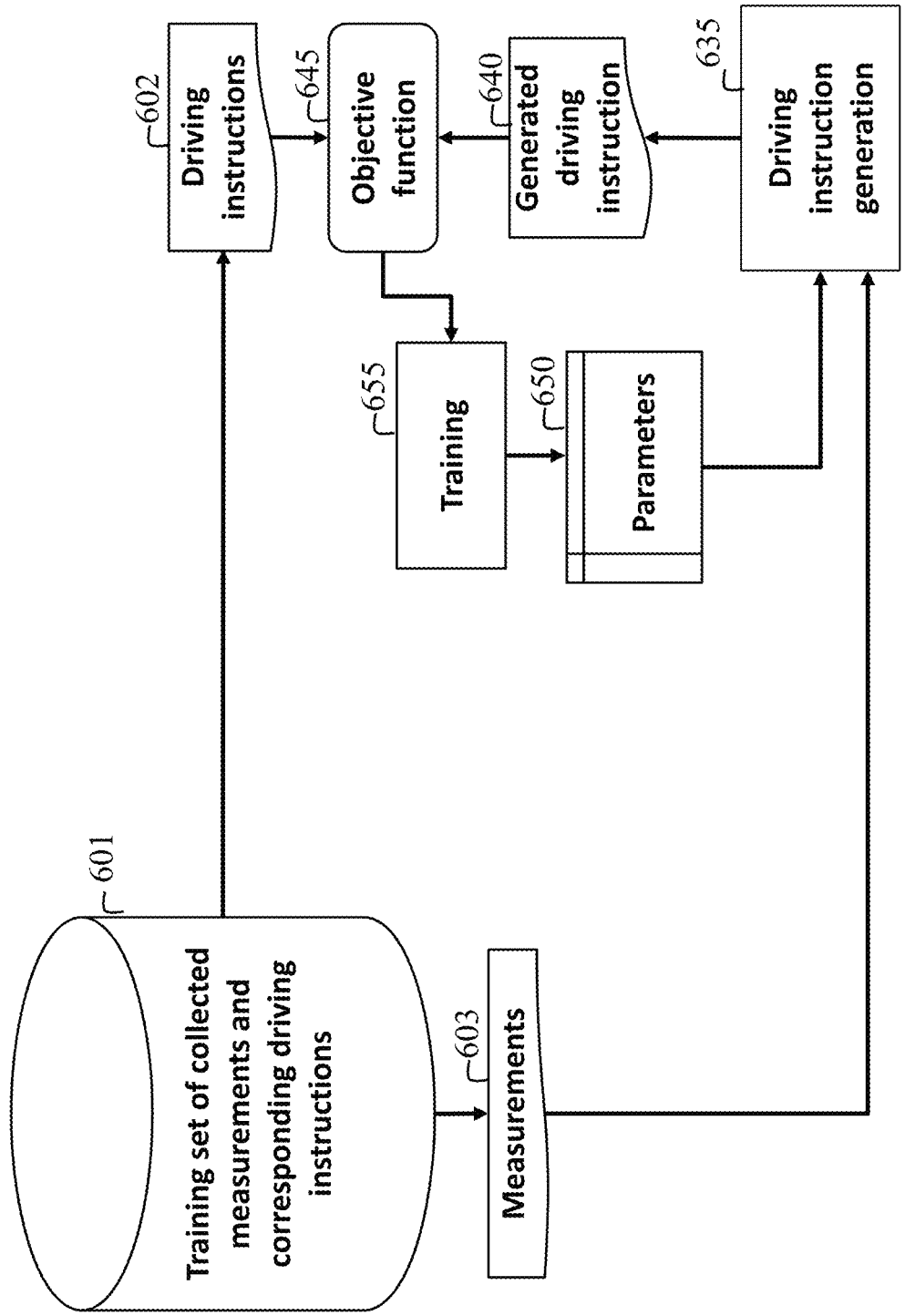
FIG. 6D is a flow diagram illustrating end-to-end training of a parametric function of a navigation system configured to generate driving instructions based on measurements from a scene, according to embodiments of the present disclosure.

FIG. 6D is a flow diagram illustrating end-to-end training of a parametric function 635 of a navigation system 600D configured to generate driving instructions 640 based on measurements 603 from a scene, according to embodiments of the present disclosure. Training can be performed by considering a training set 601 of collected training data examples including combinations of observed measurements 603 and corresponding driving instructions 602. An objective function computation module 645 computes an objective function by computing an error function between the generated driving instruction 640 and the training driving instructions 602. The objective function can be used by a training module 655 to update the parameters 650.

Figure 6E:
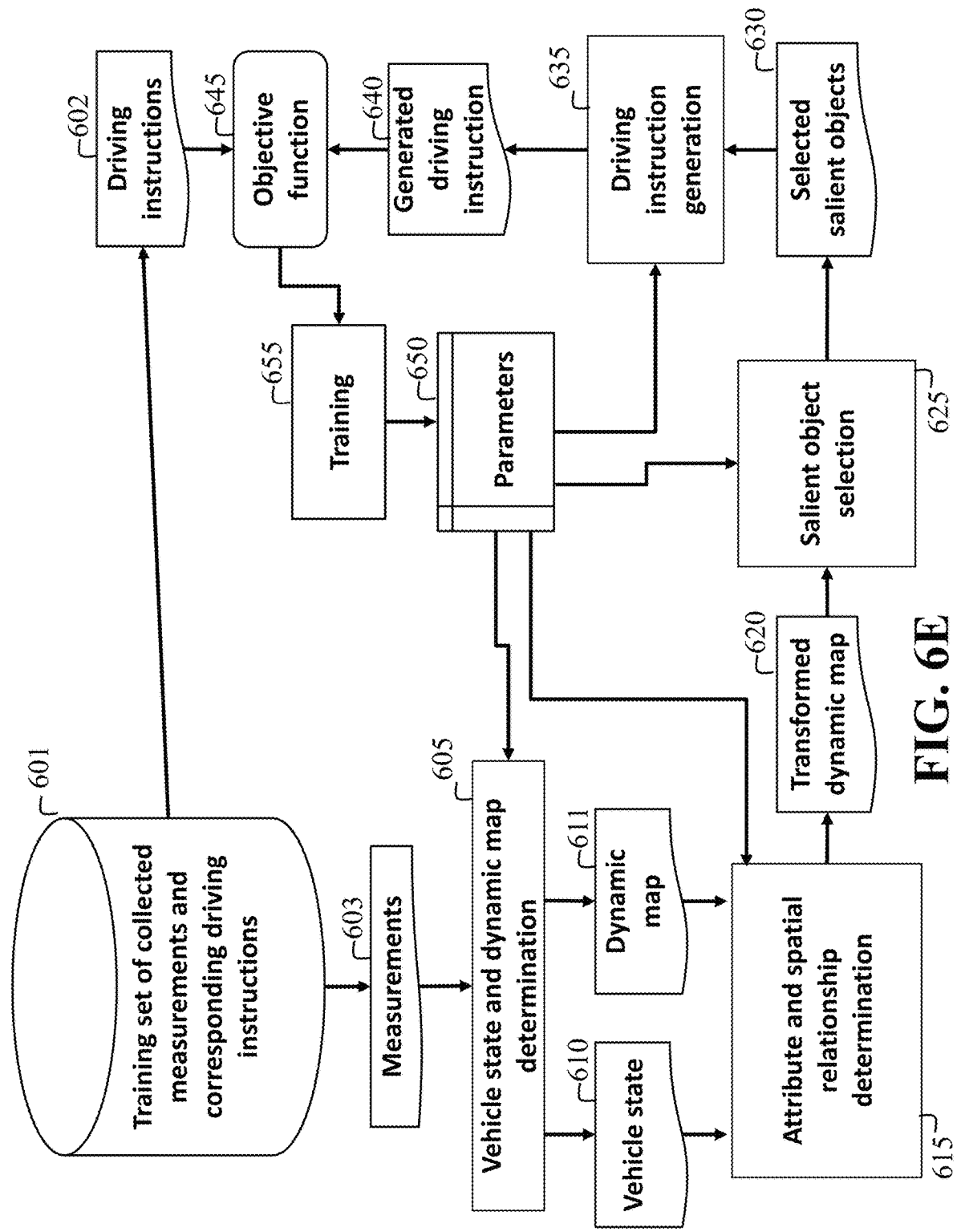
FIG. 6E is a flow diagram illustrating training of parametric functions of a navigation system, a first parametric function being configured to determine a state of the vehicle and a dynamic map based on measurements from a scene, a second parametric function being configured to determine attributes and spatial relationships of a set of salient objects of the dynamic map based on the state of the vehicle to obtain a transformed dynamic map, a third parametric function being configured to select a subset of salient objects from the transformed dynamic map, and a fourth parametric function being configured to generate driving instructions based on the selected salient objects, according to embodiments of the present disclosure.

FIG. 6E is a flow diagram illustrating training of parametric functions of a navigation system 600E, a first parametric function 605 being configured to determine a state of the vehicle 610 and a dynamic map 611 based on measurements 603 from a scene, a second parametric function 615 being configured to determine attributes and spatial relationships of a set of salient objects of the dynamic map 611 based on the state of the vehicle 610 to obtain a transformed dynamic map 620, a third parametric function 625 being configured to select a subset of salient objects 630 from the transformed dynamic map 620, and a fourth parametric function 635 being configured to generate driving instructions 640 based on the selected salient objects 630, according to embodiments of the present disclosure. For example, each parametric function may be implemented as a neural network or as a rule-based system, with parameters included in the set of parameters 650. Training can be performed by considering a training set 601 of collected training data examples including combinations of observed measurements 603, and corresponding driving instructions 602. An objective function computation module 645 computes an objective function by computing an error function between the generated driving instruction 640 and the training driving instructions 602. The objective function can be used by a training module 655 to update the parameters 650.

Figure 6F:
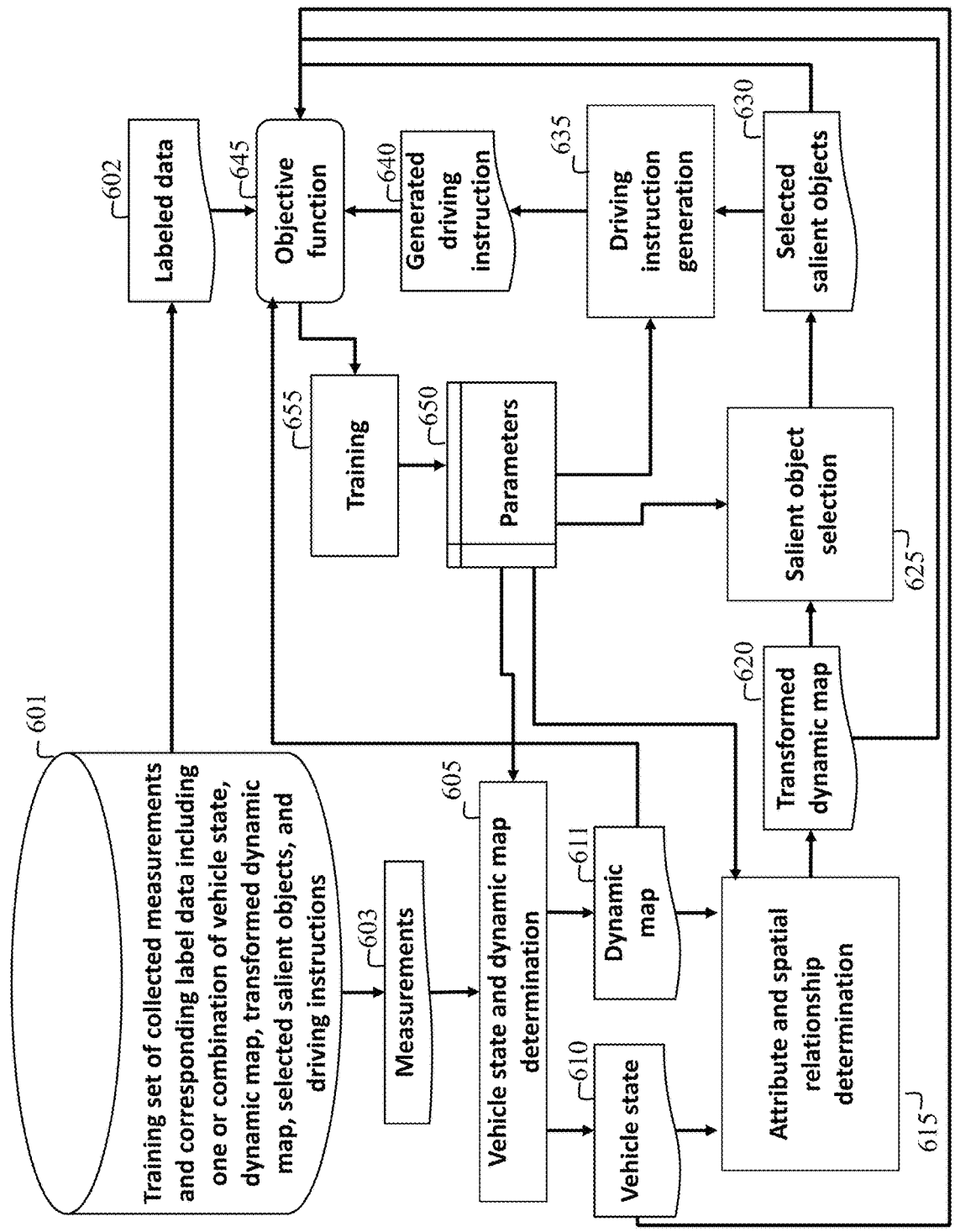
FIG. 6F is a flow diagram illustrating multi-task training of parametric functions of a navigation system, a first parametric function being configured to determine a state of the vehicle and a dynamic map based on measurements from a scene, a second parametric function being configured to determine attributes and spatial relationships of a set of salient objects of the dynamic map based on the state of the vehicle to obtain a transformed dynamic map, a third parametric function being configured to select a subset of salient objects from the transformed dynamic map, and a fourth parametric function being configured to generate driving instructions based on the selected salient objects, according to embodiments of the present disclosure.

FIG. 6F is a flow diagram illustrating multi-task training of parametric functions of a navigation system 600E, a first parametric function 605 being configured to determine a state of the vehicle 610 and a dynamic map 611 based on measurements 603 from a scene, a second parametric function 615 being configured to determine attributes and spatial relationships of a set of salient objects of the dynamic map 611 based on the state of the vehicle 610 to obtain a transformed dynamic map 620, a third parametric function 625 being configured to select a subset of salient objects 630 from the transformed dynamic map 620, and a fourth parametric function 635 being configured to generate driving instructions 640 based on the selected salient objects 630, according to embodiments of the present disclosure. For example, the parametric functions can be implemented as neural networks with parameters included in a set of parameters 650. Training can be performed by considering a training set 601 of collected training data examples including combinations of observed measurements 603, and corresponding label data 602 including one or combination of vehicle state labels, dynamic map labels, transformed dynamic map labels, selected salient objects, and driving instructions. An objective function computation module 645 computes an objective function by computing a weighted sum of one or a combination of an error function between the determined vehicle state 610 and the training vehicle state from the labeled data 602, an error function between the determined dynamic map 611 and the training dynamic map from the labeled data 602, an error function between the selected salient objects 630 and the training selected salient objects from the labeled data 602, and an error function between the generated driving instruction 640 and the training driving instructions from the labeled data 602. The objective function can be used by a training module 655 to update the parameters 650.

Figure 7:
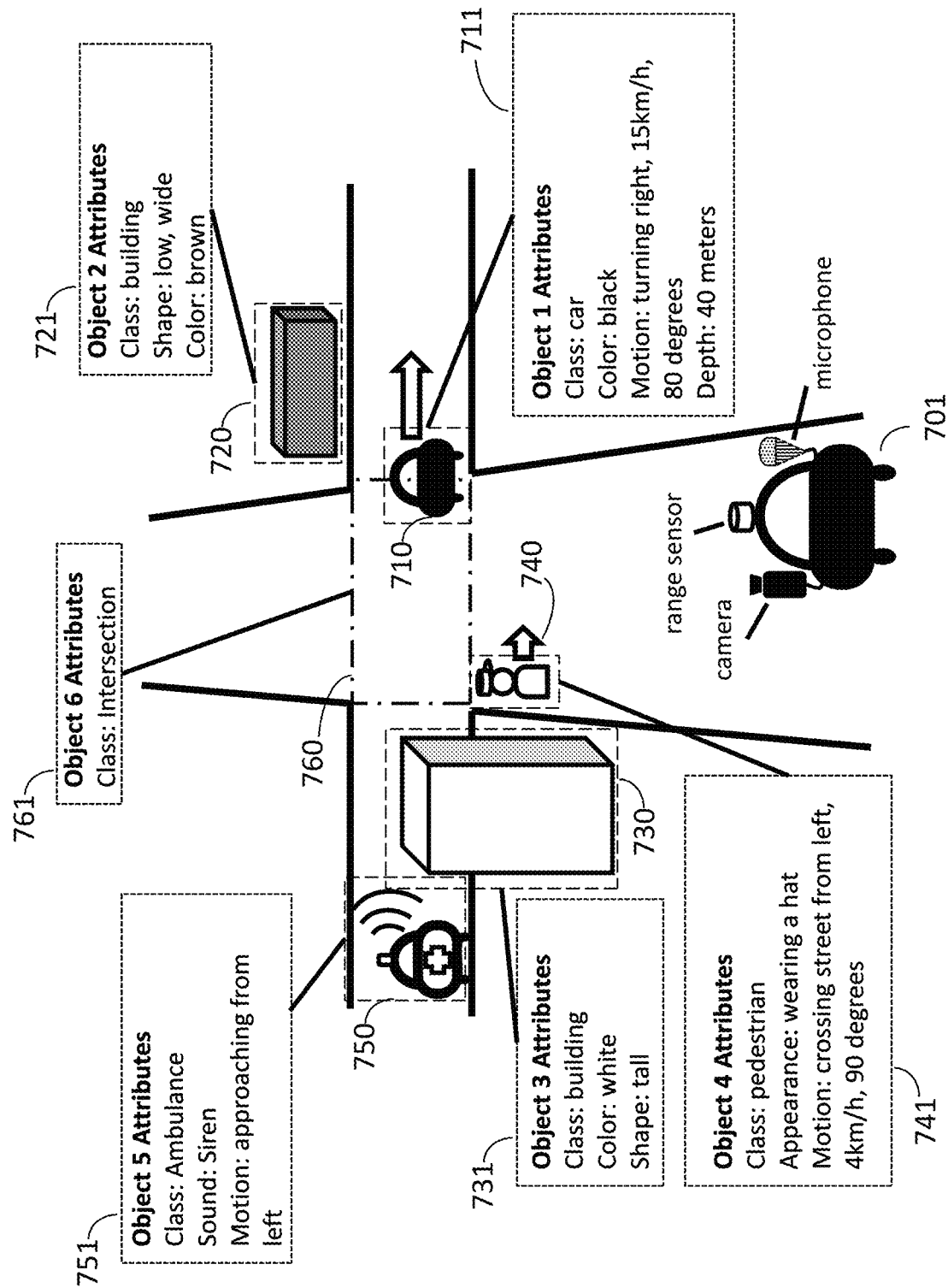
FIG. 7 shows example salient objects in the dynamic map along with the objects' attributes and the values of those attributes, according to some embodiments of the present disclosure.

FIG. 7 shows example salient objects 710, 720, 730, 740, 750, 760 in the dynamic map along with the objects' respective attributes and their values 711, 721, 731, 741, 751, 761, according to some embodiments of the present disclosure.

Types of attributes that salient objects may possess in the dynamic map include: class, color, dynamics (i.e., motion), shape, size, location, appearance, and depth. The attribute class refers to the type of object. For example, for one salient object 760, the attribute 761 class has a value intersection, indicating that the object is an intersection between two roads. Other possible values of the class attribute include car 711, building 721, pedestrian 741, and types of sounds such as siren sound 751. Another attribute, color, refers to a color of an object, and can have values such as brown 721, white 731, or black 711. Another attribute that is used in some embodiments is a state of dynamics of the object, i.e., information about the object's motion, which can take values such as the object's direction of travel, e.g., turning right 711, its speed, e.g., 15 km/h 711, or its lack of motion (if the object is a dynamic object such as a car or pedestrian that is currently stationary). Other attributes used in some embodiments include: shape 721, 731; location, such as depth 711 with respect to the vehicle 701 or location with respect to a reference frame of the dynamic map; size of the entire salient object; and size of a visible portion of the salient object, in cases where the processor determines that only part of the object is visible from the driver perspective.

It should be noted that in some embodiments according to the present disclosure, a salient object does not need to be currently visible or perceivable to a driver in order to be relevant from the driver perspective. For example, an ambulance that is approaching a current or future location of the vehicle may be relevant for inclusion in a driving instruction, such as "Warning: ambulance approaching from behind" or "Warning: ambulance approaching from behind the blue building on the left," even if the ambulance is not currently visible or audible to a driver of the vehicle.

The spatial relationship among salient objects in the dynamic map is also used in the generation of driving instructions. Spatial relationships may indicate a relative 3D position of one or more objects to another object or set of objects. The relative positions are expressed as being positioned to the left, to the right, in front of, behind, over, under, etc. Depth or range information as estimated from cameras or acquired directly from range sensors (i.e., depth sensors) such as Lidar or radar sensors are used in the determination of relative 3D positions.

Figure 8:
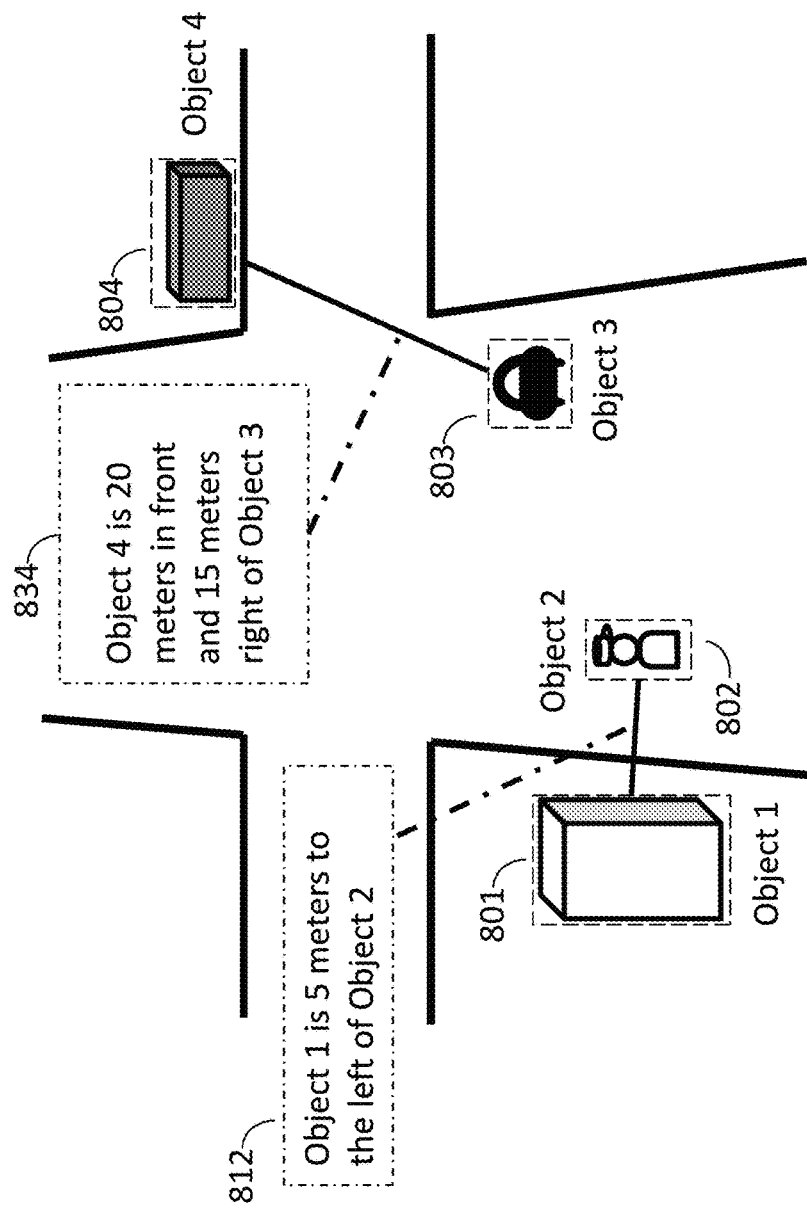
FIG. 8 illustrates a set of salient objects and their relative spatial relationships, according to some embodiments of the present disclosure.

FIG. 8 shows example salient objects 801, 802, 803, 804 in the dynamic map, as well as select pairwise spatial relationships 812, 834. In this example, salient object 801 has a spatial relationship 812 to salient object 802, indicating that salient object 801 is 5 meters to the left of salient object 802. Similarly, salient object 803 has a spatial relationship 834 to salient object 804, indicating that salient object 804 is 20 meters in front and 15 meters right of salient object 803.

Motion trajectories and sounds from salient objects can also be used in the generation of driving instructions. Motion trajectories are determined for each salient object indicating the movement of the salient object over a predetermined amount of time. Sounds associated with salient objects are acquired directly using microphones.

Figure 9:
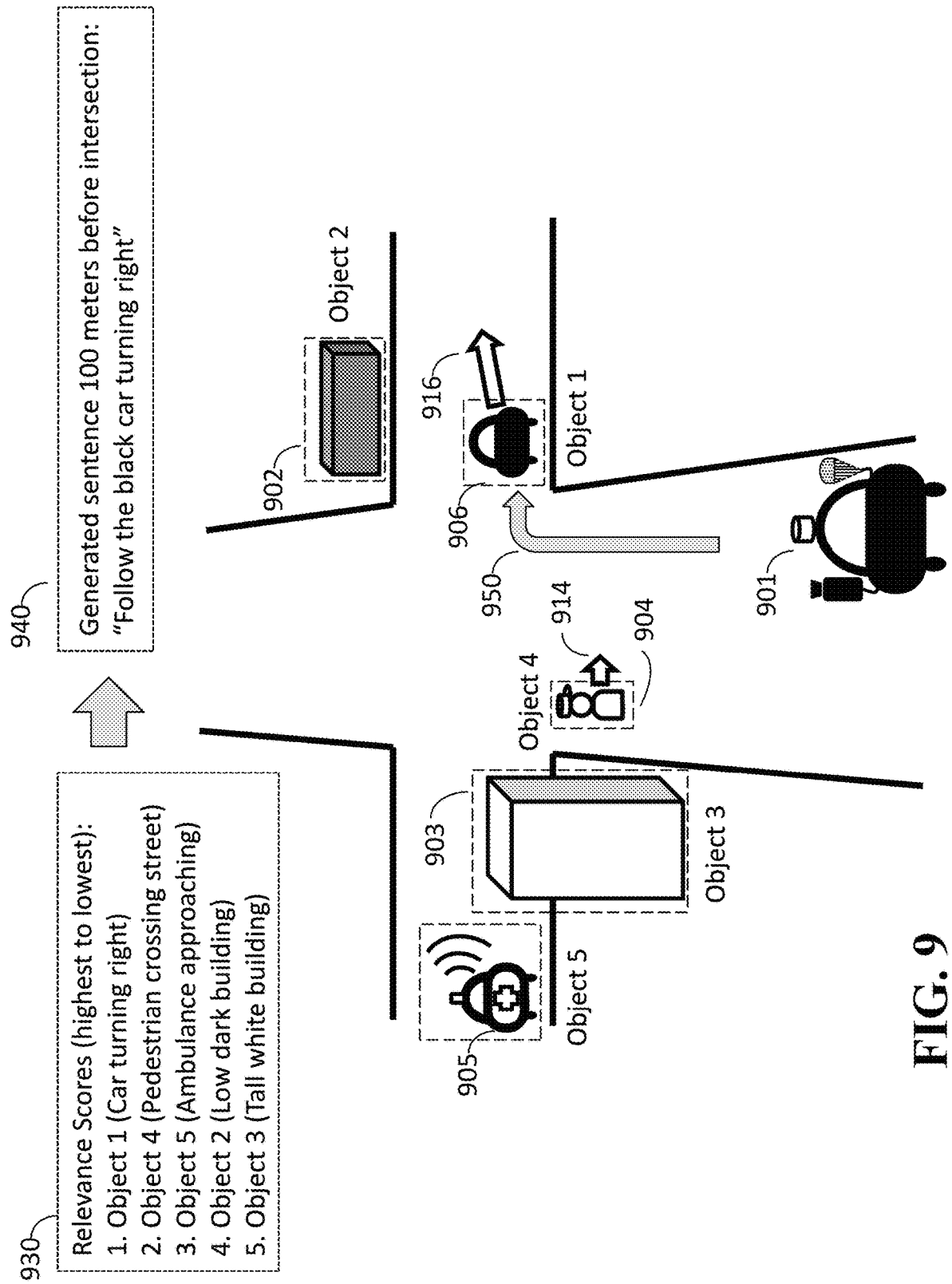
FIGS. 9 and 10 illustrate a set of salient objects and the respective relevance scores for generating a route guidance sentence at different time instances, according to some embodiments of the present disclosure.
Figure 10:
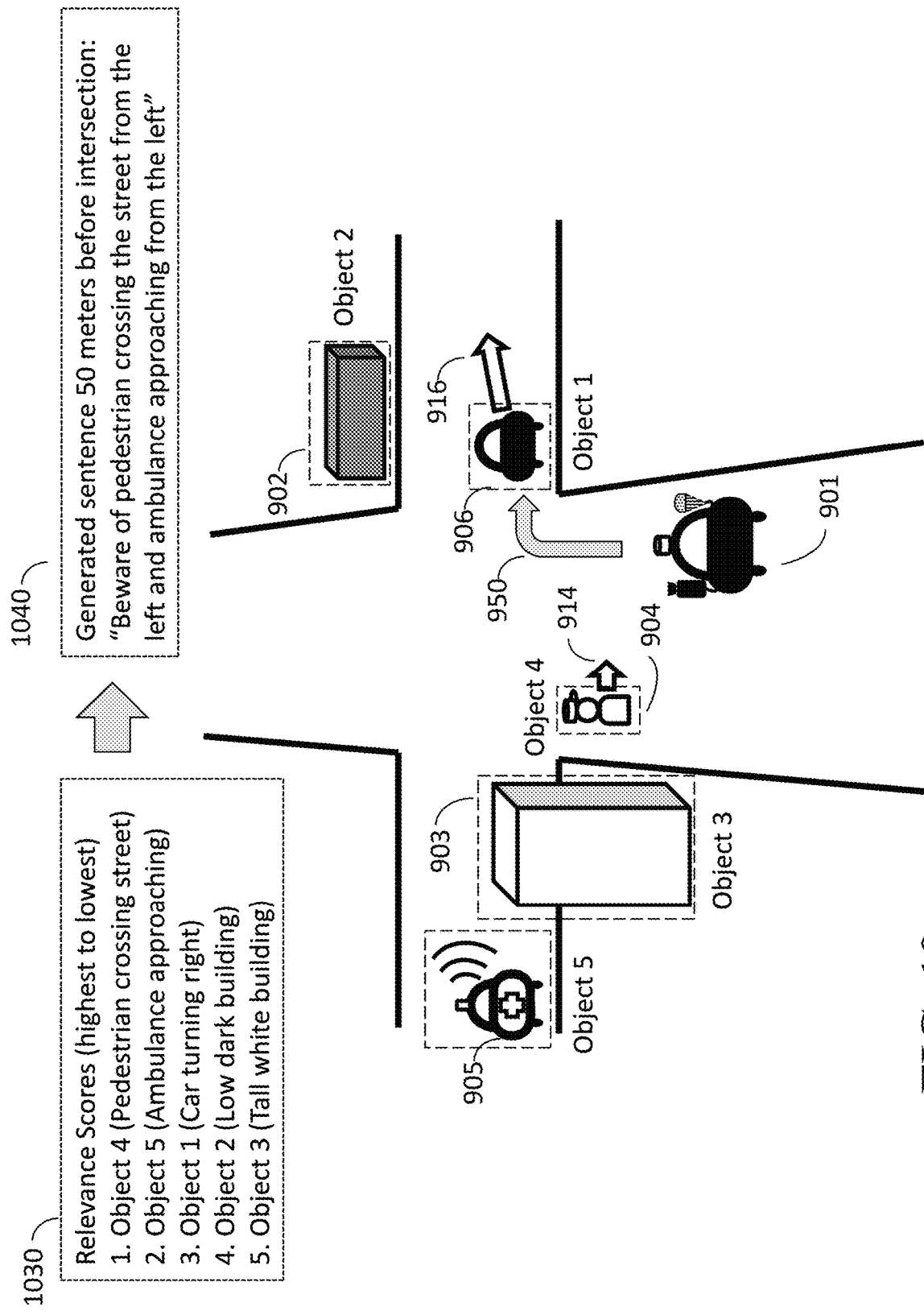

As illustrated in FIGS. 9 and 10, motion trajectory 916 is estimated based on the motion of salient object 906 over a predetermined amount of time, and motion trajectory 914 is estimated based on the motion of salient object 904 over a predetermined amount of time. The scene also includes static objects 902, 903 as well as an occluded object 905, which emits a unique sound that can be perceived by the measurement system of the vehicle 901.

At a particular instance of time, the navigation system can compare attributes of the salient objects perceived from the driver perspective to estimate a relevance score for each salient object indicating relevance of the salient object for inclusion in the generated driving instruction. The navigation system then selects a salient object for inclusion in the generated driving instruction from the set of salient objects based on a value of its relevance score. The navigation system estimates the relevance score of each salient object based on one or combination of a function of a distance of the salient object to the vehicle, a function of a distance of the salient object to a next turn on the route, and a function of a distance of the vehicle to the next turn on the route.

For the examples illustrated in FIGS. 9 and 10, the route of the vehicle 901 indicates that the vehicle should turn right 950 at the upcoming intersection. As shown in FIG. 9, when the vehicle 901 is 100 meters from the intersection, the salient object with the highest relevance score 930 is salient object 906 with motion trajectory 916, and the generated driving instruction is "Follow the black car turning right". As shown in FIG. 10, when the vehicle 901 is 50 meters from the intersection, the salient objects with the highest relevance score 1030 include salient object 904 with motion trajectory 914 and salient object 905. In this case, the generated driving instruction 1040 is "Beware of pedestrian crossing the street from the left and ambulance approaching from the left".

These examples illustrate the adaptability of the navigation system based on the set of salient objects pertinent to the route of the vehicle at the current instance of time and their attributes, as well as the state of the vehicle.

The navigation system generates driving instructions in the form of a sentence according to rules of linguistics, such that the output interface is connected to a speaker configured to pronounce the linguistic sentence. The navigation system also supports a voice dialog system configured to accept voice requests from the driver and output voice responses to the driver, such that the linguistic sentence uses the history of operation of the voice dialog system. The voice dialog system is used to clarify a generated driving instruction or provide other means of interaction between the driver and the scene, as well as the driving instructions.

Figure 11:
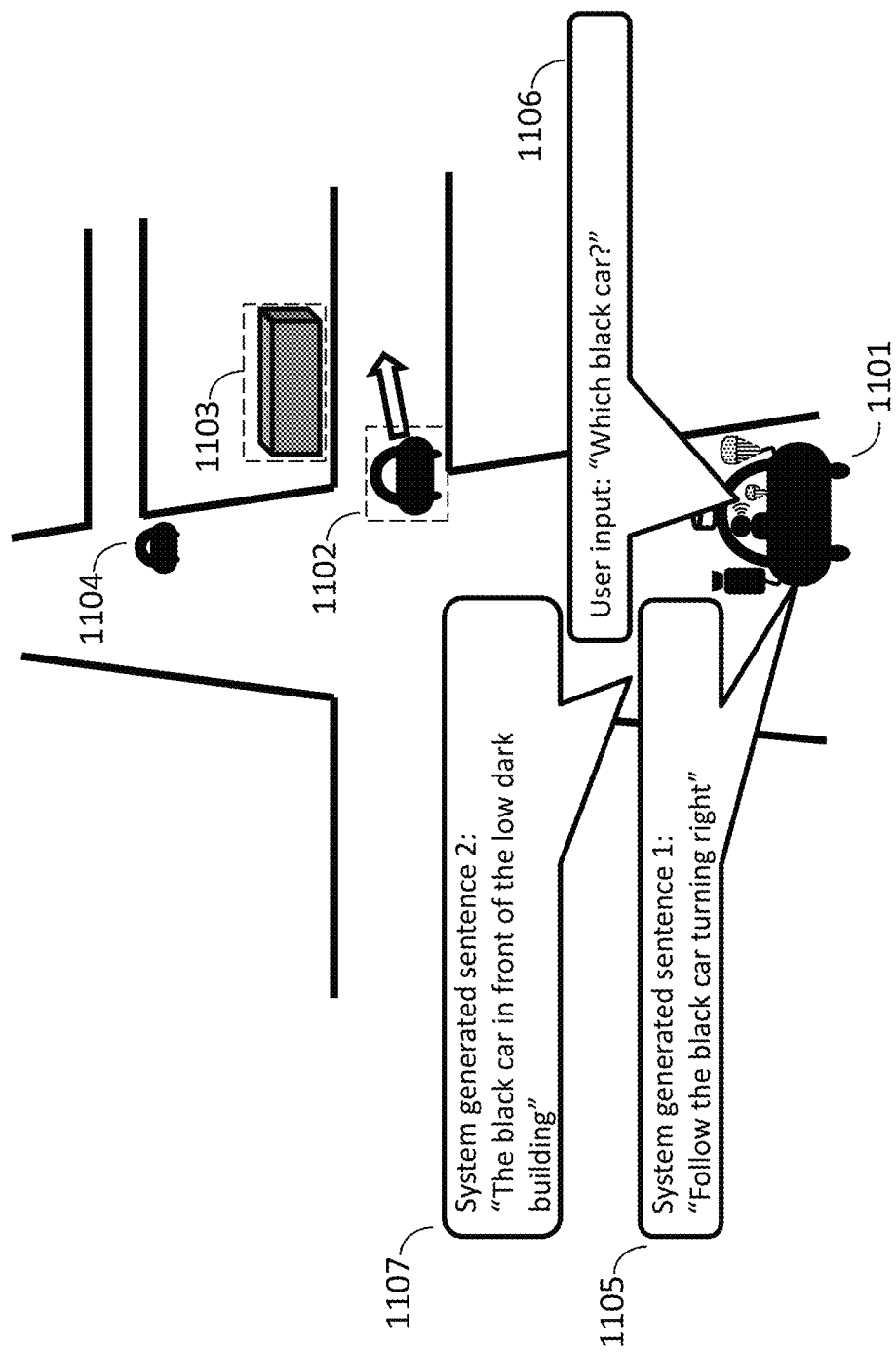
FIG. 11 illustrates an example of a dialog between the route guidance system and the driver, according to some embodiments of the present disclosure.

FIG. 11 illustrates a scene with vehicle 1101 and a set of salient objects 1102, 1103, 1104 in the dynamic map. The first generated driving instruction 1105 is "Follow the black car turning right." With two black cars in the scene 1102, 1104, the driver may request clarification, "Which black car?" 1106. The second generated driving instruction 1107 is "The black car in front of the low dark building."

Figure 12:
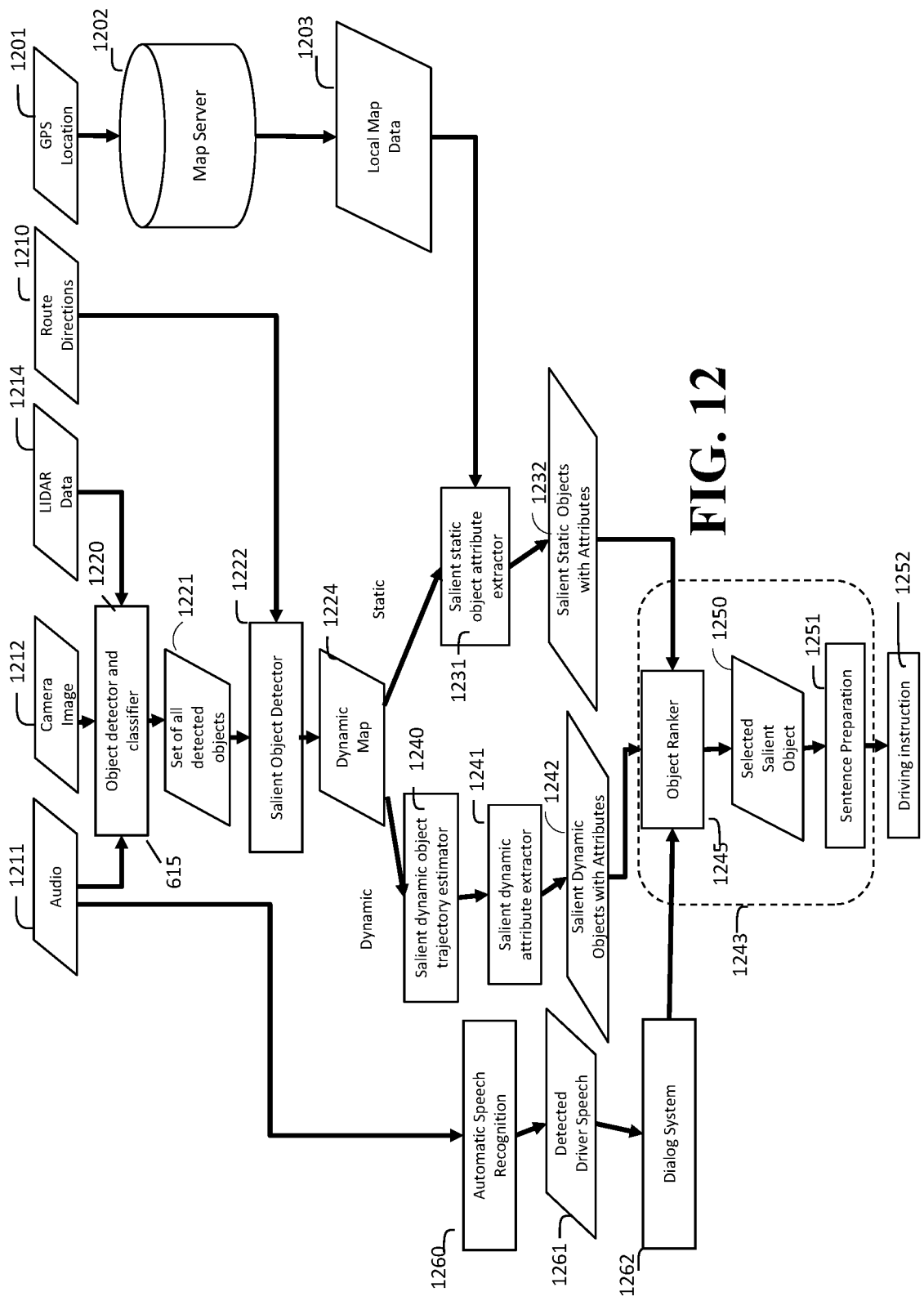
FIG. 12 is a flow chart of a particular embodiment of the route guidance system that uses a rule-based object ranker within the sentence generator, according to some embodiments of the present disclosure.

FIG. 12 is a flow chart showing a specific embodiment of the route guidance system of the present invention. In this embodiment the system receives real-time sensor information from one or more audio sensors 1211, one or more cameras 1212, one or more LIDAR range sensors 1214, the GPS location 1201 as well as the route directions 1210. The object detector and classifier 1220 outputs the set of all detected objects which should be understood to include the object's attributes. The salient object detector 1222 uses the route directions 1210 to determine the dynamic map 1224 as previously discussed. In this embodiment the salient objects follow two different processing paths depending on whether they are static objects, such as buildings, or dynamic objects such as cars. The information about dynamic objects are processed by a salient dynamic object trajectory estimator 1240 that estimates the object's trajectory consisting of the object's movement speed and direction. There are many possible implementations of the salient dynamic object trajectory estimator 1240 including one in which the object's position in a first camera image is compared to the object's position in a second camera image to estimate the object's trajectory.

Thereafter, the attributes of salient dynamic objects are extracted by a salient dynamic object attribute extractor 1241 to result in the set of salient dynamic objects with attributes 1242. The attributes of the set of salient static objects are extracted by the salient static object attribute extractor 1231 to result in the set of salient static objects with attributes 1232. The salient static object attribute extractor 1231 also receives as input local map data 1203 obtained from a map server 1202 using the vehicles GPS location 1201. This enables the salient static object attribute extractor 1231 to include additional attributes of the salient static object such as the object's name. For example, if the salient static object is a business the attributes for that object may include the business name.

There are many possible embodiments of the sentence generation module 1243. A very powerful one is a parametric function implemented as neural network that is trained using a dataset of salient objects and corresponding sentences provide by human labelers.

The specific embodiment of sentence generation module 1243 illustrated in FIG. 12 employs a rule-based object ranker 1245 that uses a set of hand generated rules to rank the salient objects in order to output a selected salient object 1250. The rules may use to compare the set of salient objects based on their data and attributes to rank the salient objects to identify a selected salient object 1250. For example, the rules may favor dynamic objects moving the in the same direction as the vehicle. The rules may favor larger objects over smaller ones, or favor bright colors, such as red or green, over darker colors such as brown or black.

As a specific example of an embodiment of the object ranker 1245 we mathematically define two bounding boxes, one for the intersection of next turning point and a second for an object, $$\bar{b} \triangleq (\bar{x}_1, \bar{y}_1, \bar{x}_2, \bar{y}_2) \qquad \text{Intersection:}$$

$$b \triangleq (x_1, y_1, x_2, y_2) \qquad \text{Object:}$$

where $\bar{x}_1$, and $\bar{y}_1$ are the upper left x and y camera image coordinates, respectively, of the next turning point's intersection's bound box $\bar{b}$, $\bar{x}_2$ and $\bar{y}_2$ are the lower right x and y camera image coordinates, respectively, of the intersection's bounding box $\bar{b}$ and $x_1$, and $y_1$ are the upper left x and y camera image coordinates, respectively, of the object's bounding box b, $x_2$ and $y_2$ are the lower right x and y camera image coordinates, respectively, of the object's bounding box b.

For each salient object, O, we compute a set of measures related to its data and attributes. For example $$F_A = \log \frac{(x_2 - x_1)(y_2 - y_1)}{(\bar{x}_2 - \bar{x}_1)(\bar{y}_2 - \bar{y}_1)}$$

is a number that is a measure the object's area in the camera image. It is larger for larger objects.

$$F_O = -\log \frac{N(O)}{H}$$

is a number that is a measure of how common a salient object of a given class is among all salient objects, where N(O) is the number of salient objects with the same class as O and H is the total number of salient objects. It is larger if there are fewer objects of the same class as O.

$$F_C = -\log \frac{N(C)}{H}$$

is a number that is a measure of how common a salient object of a given color is among all salient objects, where N(c) is the number of salient objects with the same color as o and H is the total number of salient objects. It is larger if there are fewer salient objects with the same color as salient object O.

Each of these measures can be combined into a salient object score by $$S = W_A F_A + W_o F_o + W_C F_C$$

where $W_A$, $W_o$ and $W_c$ are manually determined weights use to define the relative importance of each measure. For example, we might choose $W_A$=0.6, $W_o$=0.3, and $W_c$=0.1, respectively. Then the object ranker 1245 computes S for all of the salient objects and orders them from greatest to least. The selected salient object 1250 may then be determined as that salient object with the largest score S. The exact values for the weights are usually manually tuned until the system works well. It is to be understood that there are many possible salient object measures as well as ways to combine them into a score and the above disclosure is only one possible embodiment.

Additionally, in this embodiment the object ranker 1245 of the sentence generator 1243 receives as input any detected driver speech 1261 from the driver that has been detected from the audio input 1211 by an automatic speech recognition module 1260. The dialog system 1262 provides an output used to adjust the object ranker's 1245 function. For example, a previous driving instruction using a first salient object was rendered to the driver, but the driver did not see the referenced salient object. The result is that the driver indicates by speech that they did not see the salient object. Therefore, the object ranker should reduce the score of the previous salient object in order to select an alternate salient object as the selected salient object 1250.

Further, another embodiment of the present invention is based on recognition that a method for providing route guidance for a driver in a vehicle can be realized by steps of acquiring multimodal information, analyzing the acquired multimodal information, identifying one or more salient objects based on the route, and generating a sentence that provides the route guidance based on the one or more salient objects. The method may include a step of outputting the generated sentence using one or more of a speech synthesis module or a display. In this case, a route is determined based on a current location and a destination, the sentence is generated based on the acquired multimodal information and the salient objects, and the multimodal information includes information from one or more imaging devices. The analyzing may be achieved by including one or combination of steps of detecting and classifying a plurality of objects, associating a plurality of attributes to the detected objects, detecting locations of intersections in a heading direction of the vehicle based on the route, estimating a motion trajectory of a subset of the objects, and determining spatial relationships among a subset of the detected objects where the spatial relationship indicates relative positions and orientations between the objects. In some cases, the steps of detecting and classifying of the plurality of objects can be performed by use of a machine learning-based system, and further the attributes may include one of or combination of a dominant color, a depth relative to the current location of the vehicle, the object classes of the classifying may include one or more of pedestrians, vehicles, bicycles, buildings, traffic signs. Further, the generated sentence can provide a route guidance that includes driving instructions in relation to the salient objects, and the generated sentence indicates a warning based on a result of the analyzing.

In some cases, the imaging devices may be one or more cameras, one or more range sensors, or combination of the one or more cameras, one or more range sensors. In some cases, at least one range sensor may be LIDAR (Light Detection and Ranging) or radar or the like, and the one or more of the imaging devices can capture information from the vehicle surroundings. Further, the multimodal information can include signals acquired in real-time while the vehicle is being driven or/and sound signals acquired by one or more microphones, and in some cases, the sound signals can be speech by a user, which allows a navigation system using the method to realize interact with the user (driver), and generate more informative information to the user. The multimodal information may a history of interactions between the user and the system, and include map information. The interactions can include one or more of user speech input and previously generated sentences. The analyzing can also include localizing the vehicle in the map. In this case, the map information may include a plurality of points of interest and one or more of the salient objects are selected from the points of interest based on a result of the analyzing.

In the above, the navigation system is described as one of example applications of a scene-aware interaction system. However, the present invention is not limited to the navigation system. For instance, some embodiments of the present invention can be used for in-vehicle infotainment and home appliances, interaction with service robots in building systems, and surveying systems. GPS is merely one of localization methods for a navigation system, other localization methods can be used to other applications.

According to another embodiment of the present disclosure, a scene-aware interaction system can be realized by changing the driver control interface 310 and the driver controls 311 into a robot control interface (not shown) and a robot control interface. In this case, the GPS/Locator Interface 376 and the GPS/Locator 377 may be used according to the system design for the service robots, and the training dataset can be changed.

Further, embodiments according to the present disclosure provide effective method for performing the multimodal fusion model, thus, the use of a method and system using the multimodal fusion model can reduce central processing unit (CPU) usage, power consumption and/or network band width usage.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Further, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A navigation system for providing driving instructions to a driver of a vehicle traveling on a route based on real-time description of objects in a scene pertinent to the route of the vehicle, wherein the navigation system is operatively connected through one or a combination of wired and wireless communication channels to multiple sensors configured to provide measurements of the scene and an output device configured to communicate the driving instructions to the driver of the vehicle, the navigation system comprising:

an input interface configured to accept first measurements sensed by a first sensor of the multiple sensors and second measurements sensed by a second sensor of the multiple sensors;

a memory configured to store executable instructions;
a processor configured to execute the executable instructions to generate the driving instructions for the vehicle by performing a computer-implemented multimodal fusion method, wherein to perform the computer-implemented multimodal fusion method the processor is configured to:
extract first features indicative of first attributes and first spatial relationships of first objects sensed by the first sensor, based on the first measurements;
extract second features indicative of second attributes and second spatial relationships of second objects sensed by the second sensor, based on the second measurements;
annotate the first features with encodings of a first direction for the vehicle to follow the route with respect to a first corresponding object of the first objects and the second features with encodings of a second direction for the vehicle to follow the route with respect to a second corresponding object of the second objects;
encode the annotated first features and the annotated second features with a multimodal attention neural network by temporally correlating the annotated first features of the first measurements sensed at different instances of time to produce first encodings, temporally correlating the annotated second features of the second measurements sensed at different instances of time to produce second encodings, transforming the first encodings and the second encodings into a common latent space, and fusing the transformed first encodings and the transformed second encodings using an attention mechanism producing an encoded representation of the scene including a weighted combination of the first encodings and the second encodings with weights determined by the attention mechanism;
decode the encoded representation of the scene with a sentence generation neural network to generate a driving instruction of the driving instructions using a vocabulary of types of salient objects, properties of the salient objects, and navigating actions; and
submit the driving instruction of the driving instructions to the output device.

2. The navigation system of claim 1, wherein the processor is configured to extract the first features and the second features using one or multiple feature extractors trained to detect and extract the first attributes of the first objects and the second attributes of the second objects from the first measurements and the second measurements.

3. The navigation system of claim 2,
wherein the processor is further configured to:
determine the first spatial relationships of the first objects and the second spatial relationships of the second objects with respect to a location of the vehicle.

4. The navigation system of claim 1, wherein each of the first attributes and the second attributes includes one of an absolute attribute value, a relative attribute value with respect to a state of the vehicle on the route, a type, a size, a color, a distance from the vehicle, or a velocity.

5. The navigation system of claim 1,
wherein the first objects and the second objects include at least one static object and at least one dynamic object.

6. The navigation system of claim 1, wherein a first mode of the first sensor governing a type of the first measurements is different from a second mode of the second sensor governing a type of the second measurements, wherein the first mode and the second mode are selected from a group including sounds, color images and depth images.

7. The navigation system of claim 1, wherein the multimodal attention neural network includes multiple input subnetworks, one for each of the multiple sensors, to encode a respective measurement of each of the multiple sensors, and includes a fusing subnetwork for fusing outputs of the multiple input subnetworks with the attention mechanism.

8. The navigation system of claim 7, wherein each of the multiple input subnetworks includes a unimode attention trained to provide temporal correlation of features of each of the multiple sensors.

9. The navigation system of claim 1, wherein the multiple sensors include a local sensor arranged on the vehicle and connected to the navigation system through the wired communication channel.

10. The navigation system of claim 1, wherein the multiple sensors include a remote sensor arranged outside of the vehicle and connected to the navigation system through the wireless communication channel.

11. The navigation system of claim 1, wherein the multiple sensors include one or a combination of a sensor arranged on a neighboring vehicle and a sensor arranged at a measurement system.

12. The navigation system of claim 1, wherein the sentence generation neural network includes a long short-term memory (LSTM) decoder.

13. The navigation system of claim 1, wherein the sentence generation neural network is trained based on a training set of measurements and corresponding driving instructions.

14. The navigation system of claim 1, wherein the output device generates an acoustical signal based on the driving instructions.

* * * * *